US012769252B2

(12) United States Patent
Stranczl

(10) Patent No.: US 12,769,252 B2
(45) Date of Patent: Oct. 20, 2026

(54) HOROLOGICAL LINKAGE MECHANISM WITH FLEXIBLE GUIDANCE

(71) Applicant: Montres Breguet S.A., L'Abbaye (CH)

(72) Inventor: Marc Stranczl, Nyon (CH)

(73) Assignee: Montres Breguet S.A., L'Abbaye (CH)

( * ) Notice: Subject to any disclaimer, the term of this patent is extended or adjusted under 35 U.S.C. 154(b) by 932 days.

(21) Appl. No.: 17/926,410

(22) PCT Filed: Jun. 3, 2021

(86) PCT No.: PCT/EP2021/064900
§ 371 (c)(1),
(2) Date: Nov. 18, 2022

(87) PCT Pub. No.: WO2021/245187
PCT Pub. Date: Dec. 9, 2021

(65) Prior Publication Data

US 2023/0185246 A1 Jun. 15, 2023

(30) Foreign Application Priority Data

Jun. 4, 2020 (EP) .................................... 20178321

(51) Int. Cl.
*G04B 19/26* (2006.01)
*G04B 19/253* (2006.01)

(52) U.S. Cl.
CPC ....... *G04B 19/268* (2013.01); *G04B 19/2534* (2013.01); *G04B 19/25353* (2013.01)

(58) Field of Classification Search
CPC ...................... G04B 19/2534; G04B 19/25353
See application file for complete search history.

(56) References Cited

U.S. PATENT DOCUMENTS 9,201,398 B2 * 12/2015 Cusin .................. G04B 17/063
10,216,146 B2 * 2/2019 Chabloz ................ G04B 13/00
(Continued)

FOREIGN PATENT DOCUMENTS

CH 707 811 A2 9/2014
CH 715105 A1 * 12/2019 ........... G04B 19/268
(Continued)

OTHER PUBLICATIONS

International Search Report for PCT/EP2021/064900, dated Aug. 10, 2021.

*Primary Examiner* — Edwin A. Leon
*Assistant Examiner* — Jason M Collins
(74) *Attorney, Agent, or Firm* — Sughrue Mion, PLLC

(57) ABSTRACT

A linkage mechanism (100) for a horological mechanism, for transmitting a movement between an actuator and a receiver, including a structure (10) relative to which a carrier (9), movable according to a single degree of freedom under the action of the actuator, is connected to the structure (10) by at least one flexible guide (50), each of the carrier (9) and the structure (10) being more rigid than each flexible guide (50), at least one flexible guide (50) is planar, and includes flexible necks (51), with a smaller section than the elements that are adjacent thereto, and/or flexible blades (5, 6, 52), with a smaller section than the elements that are adjacent thereto, and forming articulations. At least two arms are articulated to the structure (10) at two distinct points, and kinematically cooperate with each other, or with a tertiary bar or a tertiary structure.

33 Claims, 17 Drawing Sheets

(56) References Cited

U.S. PATENT DOCUMENTS

| | | | | |
|---|---|---|---|---|
| 12,055,896 | B2 * | 8/2024 | Mabillard | G04B 5/185 |
| 12,517,462 | B2 * | 1/2026 | Kahrobaiyan | G04B 17/32 |
| 2013/0176829 | A1 | 7/2013 | Cusin et al. | |
| 2015/0252785 | A1 | 9/2015 | Klein Meuleman | |
| 2018/0363376 | A1 | 12/2018 | Jones et al. | |
| 2019/0025761 | A1 | 1/2019 | Chabloz | |
| 2019/0332061 | A1 * | 10/2019 | Mabillard | G04B 19/253 |
| 2020/0081434 | A1 | 3/2020 | Penning et al. | |
| 2022/0163922 | A1 * | 5/2022 | Zaugg | G04B 15/08 |
| 2023/0195034 | A1 * | 6/2023 | Stranczl | G04B 15/14<br>368/124 |

FOREIGN PATENT DOCUMENTS

| | | | |
|---|---|---|---|
| CN | 109952541 | A | 6/2019 |
| JP | 2013-531257 | A | 8/2013 |
| JP | 2019-20373 | A | 2/2019 |
| JP | 2020-502525 | A | 1/2020 |
| WO | 2012/010408 | A1 | 1/2012 |
| WO | 2018/115014 | A2 | 6/2018 |

* cited by examiner

HOROLOGICAL LINKAGE MECHANISM WITH FLEXIBLE GUIDANCE

CROSS REFERENCE TO RELATED APPLICATIONS

This application is a National Stage of International Application No. PCT/EP2021/064900 filed Jun. 3, 2021, claiming priority based on European Patent Application No. 20178321.4 filed Jun. 4, 2020.

FIELD OF THE INVENTION

The invention relates to a linkage mechanism for a horological mechanism, arranged for a movement transmission between an actuator and a receiver.

The invention also relates to a horological mechanism, including an actuator and a receiver, and at least one such linkage mechanism, arranged for a movement transmission between the actuator and the receiver.

The invention also relates to a horological movement, including at least one such horological mechanism, and/or at least one such linkage mechanism.

The invention also relates to a watch, including at least one such horological movement, and/or at least one such horological mechanism, and/or at least one such linkage mechanism.

The invention relates to the field of horological mechanisms, and in particular display mechanisms and complication mechanisms.

BACKGROUND OF THE INVENTION

The movement transformation inside a horological mechanism requires a large volume, which cannot be allocated to complication housing, and results in a loss of energy efficiency, which affects the power reserve of the timepiece, in particular a watch.

SUMMARY OF THE INVENTION

The invention suggests making the movement transformation mechanisms as flat as possible, even though they have to include two or three parallel levels in some cases, and to find a solution to reduce frictions, by limiting drive contacts to what is strictly necessary, while including a minimum of rubbing components which are always detrimental to the overall efficiency.

To this end, the invention adapts to horological mechanisms some principles of linkage mechanisms well known in heavy mechanics or in general mechanics. Nonetheless, the aim is not to create more frictions than those suppressed, at the pivots, articulations, guides and other slides.

Thus, the invention introduces into control mechanisms, for example display or winding control, flexible guides, whose horological applications have primarily concerned oscillators hitherto.

Hence, the invention aims to use flexible guides which enable movement transformations according to the principles of Hoeckens, Chebyshev, Roberts, Klann, linkage mechanisms and the same, which will be illustrated hereinafter.

It is important to understand that, although the movement of these mechanisms is generally performed in the plane, in two directions (in x and y), these articulations have only one degree of freedom. A particular point of the mechanism, like the point M in FIG. 9, should necessarily perform the drawn path: its path is captive, and this point has only one real degree of freedom, along this path. Similarly, the point P in FIG. 12 follows a linear path.

The transformation of known mechanisms in the form of articulated bars is possible with guides and articulations in the form of a flexible guide, which eliminates losses.

Thus, the invention relates to a linkage mechanism for a horological mechanism, arranged for a movement transmission between an actuator and a receiver, according to claim 1.

The invention also relates to a horological mechanism, including an actuator and a receiver, and at least one such linkage mechanism, arranged for a movement transmission between the actuator and the receiver.

The invention also relates to a horological movement, including at least one such horological mechanism, and/or at least one such linkage mechanism.

The invention also relates to a watch, including at least one such horological movement, and/or at least one such horological mechanism, and/or at least one such linkage mechanism.

BRIEF DESCRIPTION OF THE DRAWINGS

Other features and advantages of the invention will appear upon reading the following detailed description, with reference to the appended drawings, where:

FIG. 29 is a planar view of a watch carrying this mechanism; FIGS. 30 and 31 illustrate the full moon display in the rest position, FIGS. 32 and 33 the display of a waning moon, FIGS. 34 and 35 the display of the new moon, FIGS. 36 and 37 the display of a crescent moon, FIGS. 38 and 39 the display of the full moon, and FIGS. 40 and 41 illustrate the superposition of all of the previously illustrated positions;

FIGS. 43 and 44 partially illustrate this mechanism, the crank not being represented, and a dotted circle illustrating the path of its articulation with the carrier; the articulated arm which connects the middle portion of the carrier to the fixed structure of the watch herein includes an intermediate mass suspended by two flexible guides, on the one hand to the fixed structure, on the other hand to the carrier; in this example each flexible guide includes two blades, which are crossed at least in projection on a plane parallel to that of the carrier; the virtual pivot axes defined by these crossings are substantially aligned with the attachments of these flexible guides, on the fixed structure on the one hand, and on the carrier on the other hand;

FIG. 45 illustrates the rest position, in which the linkage mechanism is preferably made in the case of a monolithic embodiment; from this rest position, the system is progressively armed from FIG. 45 to FIG. 51, and the flexible guide returns by itself from FIG. 51 to FIG. 45;

FIGS. 46 to 48 describe the linear path of the finger during the rotation of the crank;

FIG. 49, accompanied by a detail, shows the detail of the beginning of the cooperation of the finger of the carrier, herein substantially cylindrical, with the tip of a tooth of the date ring;

FIG. 50, accompanied by a detail, shows the detail of the continuation of the cooperation of the finger of the carrier, which leaves the linear path to approach the return curved path, with the tooth of the date ring, at the tooth sidewall, in a position conducive to driving the ring;

FIGS. 51 to 52 describe the curved path of the finger during the continuation of the rotation of the crank, driving the ring; naturally the display of the date on the ring is particular: the dates are not shown in numerical sequence, but are distributed according to the angular step which corresponds to the curved stroke of the finger during the return path;

FIG. 53, accompanied by a detail, shows the detail of the end of the cooperation of the carrier finger, which slides along the sidewall of the tooth of the date ring;

FIG. 54, accompanied by a detail, shows the exit of the finger of the carrier, which leaves the curved path to approach the linear path, before resuming its cycle illustrated in FIGS. 46 and the next ones;

DETAILED DESCRIPTION OF THE PREFERRED EMBODIMENTS

Figure 1:
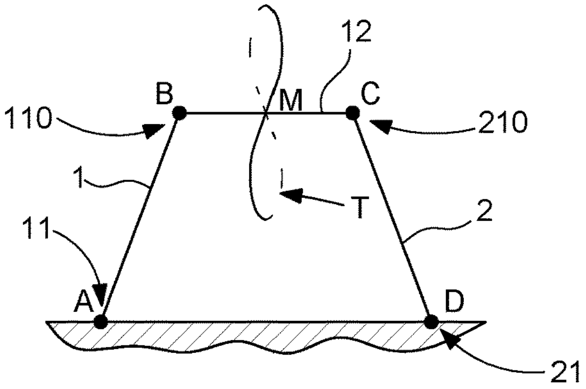
FIG. 1 represents, schematically and in planar view, a control mechanism in the form of a substantially planar articulated quadrilateral, wherein one of the sides of the quadrilateral is a fixed structure; in the particular case where the two arms articulated to this fixed structure have the same length, the middle of the fourth side, articulated to these two arms, follows a path substantially eight-like shaped.
Figure 2:
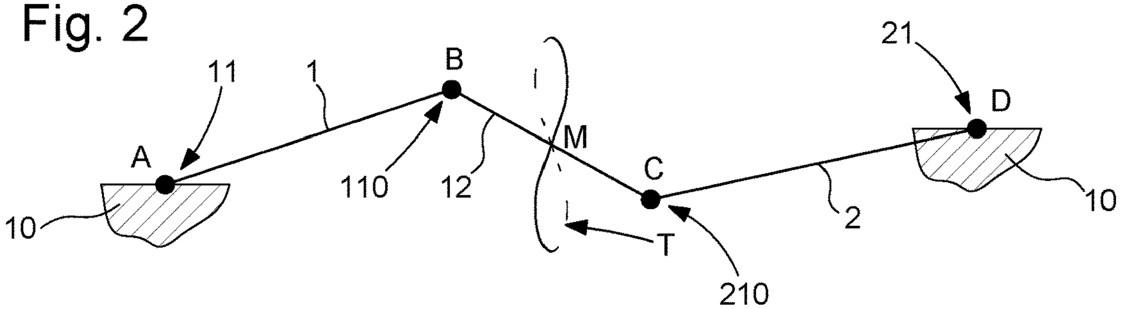
FIG. 2 represents, in a way similar to FIG. 1, a variant where the points of articulation of the arms to the fixed structure are on either side of the progress area of the fourth side, which always follows a path substantially eight-like shaped.
Figure 3:
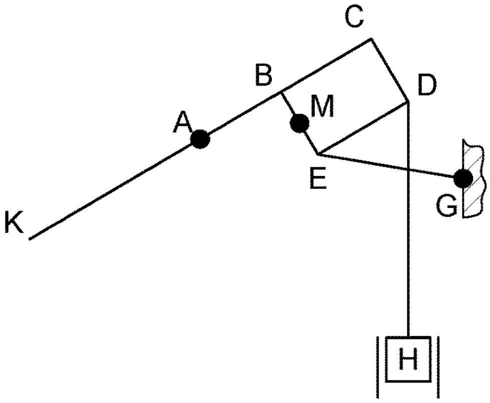
FIG. 3 represents, in a way similar to FIG. 1, another linkage mechanism called Watt's parallelogram, arranged to transform a rotational movement into a substantially rectilinear movement.
Figure 4:
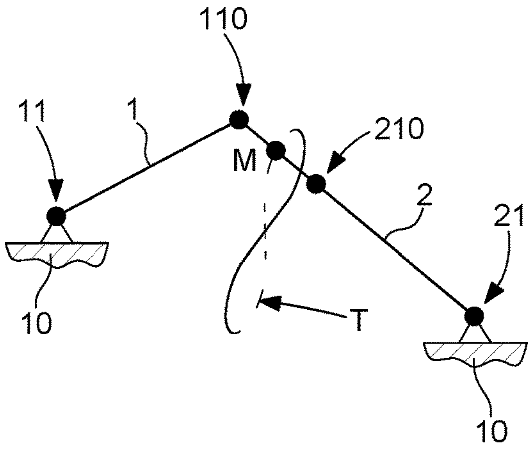
FIG. 4 represents, in a way similar to FIG. 3, a similar mechanism, wherein the path of the middle of the fourth side is substantially linear over a portion of its stroke.

For particular drive mechanisms, a linkage mechanism with four bars is known, a main bar of which is fixed, and includes two main articulations, distinct from each other; each of these main articulations carries a secondary bar at a first end, and each secondary bar is articulated at its second end, by a secondary articulation, to a tertiary bar. Thus, each of these secondary articulations describes an imposed closed path, equivalent to a single degree of freedom, even though this degree of freedom is neither linear nor circular.

By convention, the main bar will be referred to hereinafter as “fixed structure”, it may in particular be a plate, or a bridge, or another structural element of a horological movement or of a watch case, the secondary bars that are articulated to this fixed structure by main articulations will be referred to as “arms”, the other bars will then be called according to their kinematic distance from the fixed structure, for example tertiary bar, quaternary bar, each articulated to the bar (or to the arm) the furthest upstream in this kinematic chain, through an articulation bearing the name of this bar (or this arm) the furthest upstream: for example, a tertiary bar is articulated by a secondary articulation to a secondary bar or arm; and a quaternary bar is articulated by a tertiary articulation to a tertiary bar. Thus, when a N-bar mechanism is mentioned, one of these N bars consists of the fixed structure.

Thus, a four-bar mechanism generally includes a main bar or fixed structure, and includes two main articulations; each of these main articulations carries a secondary bar at a first end, and each secondary bar is articulated at its second end, by a secondary articulation, to a tertiary bar, or is articulated to the other one. Thus, each of these secondary articulations describes an imposed closed path, equivalent to a single degree of freedom, even though this degree of freedom is neither linear nor circular.

Such a four-bar mechanism is used, for example, for driving perforated film in a cinema projector. Similarly, bus windscreen wipers are each mounted on the tertiary bar of a deformable parallelogram.

More generally, a four-bar mechanism includes four rigid bodies, generally articulated together by rotating connections such as ball-joint connections or pivots. These rotating connections may be replaced, in monolithic structures as used in watchmaking, by necks which provide enough angular freedom of one bar relative to another, in the same plane, or by flexible blades or flexible blade assemblies.

These articulated guide systems allow performing movements that are sometimes complex.

The best-known examples are the deformable parallelogram, used in particular for bus windscreen wipers, and the pantograph.

The use of main bars with different lengths enables the execution of differentiated movements, like on passenger vehicles where the movement and stroke of the driver’s and passenger’s windscreen wipers are different.

The quadrilateral plane mechanisms consist of deformable quadrilaterals, the bars forming the sides of which are connected together by real or virtual pivot connections such as flexible pivots with crossed flexible blades in projection, or the same.

The raise-and-lower mechanism of a wooden horse or of a merry-go-round is guided by a deformable parallelogram. A deformable parallelogram allows carrying out a circular translational movement; this allows preserving the orientation in space, in particular with respect to the horizontal plane, of a manipulated object.

A crank-connecting rod-oscillator mechanism allows transforming an alternating movement into a continuous rotational movement, or vice versa. It is well known for driving foot-operated sewing machines: the action of the user on the pedal generates an oscillating movement of the pedal, which drives a rotating crank, for driving the sewing machine.

A pantograph mechanism allows performing a homothety on a movement, and amplifying or reducing the amplitude of a movement.

A Watt parallelogram is a crossed parallelogram, which allows obtaining a particular guidance, along an imposed curve, and which is called pseudo-linear guidance. Thus, on a wagon suspension, the axle support is suspended to the structure of the wagon by two articulated bars, parallel to each other and at different distance with respect to the rail, each connected by a primary articulation to the wagon and by a secondary articulation to the axle box, and thus, the path of the centre of the wheel relative to the wagon follows an S-shaped curve which is almost linear in its central portion.

Another mechanism intended to perform a pseudo-linear movement is a three-bar mechanism, called Chebyshev linkage, which forms a crank-connecting rod-piston system. One of the secondary articulations is replaced by a slide mechanism: the end of a secondary bar slides on the other secondary bar which is a load-bearing one, for example in the form of a trunnion which travels in an oblong slot, or a pad in a slide, or the same, the tertiary bar is then no longer necessary. A point of the load-bearing secondary bar describes a repetitive closed curve. With a particular adjustment of the lengths, a portion of this closed curve could be a straight line. Chebyshev so-called lambda mechanism (because of its shape) is a four-bar mechanism which converts rotational movement into an approximate rectilinear movement, with approximately constant speed over a portion of the path from the exit point. The tertiary bar is extended outside the two secondary articulations, and a point distant from these two secondary articulations follows, over a portion of its stroke, a rectilinear path, and returns via a curved path to its starting point. Hence, it is advantageous for any retrograde type horological display. This mechanism requires the possibility of a continuous rotation on one of the primary articulations, of the crank type, which limits its use to particular cases because it is not entirely planar.

The Hoeckens mechanism, with three bars, is close to Chebyshev linkage, and also enables the conversion of a rotational movement into a substantially rectilinear movement over a large portion of its stroke. A first articulation to the fixed structure carries a connecting rod, driven in a circular movement, and which is articulated with a long bar which slides in a slide which is itself articulated at a second point of the fixed structure.

This mechanism is used in medical robotics, like the previous one, an example of application of which could be read in the doctoral thesis of Mathieu Joinie-Maurin, with the University of Strasbourg on Sep. 2, 2012, pages 69 and the next ones.

There are more accurate yet more complex devices, such as the Peaucellier-Lipkin device, which is an articulated system allowing transforming a rectilinear movement into a circular movement, and vice versa, and is based on the geometric principle of the inversion of a circle, and it includes seven rigid rods. It is actually possible to solve the problem of the rectilinear movement with fewer, the minimum being five rods like in Hart inverter is similar but requires only five rods to achieve a substantially equivalent result.

The Roberts mechanism also converts a rotational movement into an approximate linear movement. The tertiary bar is the base of an isosceles triangle, whose two sides with the same length have the same length as the secondary bars, and the vertex of this isosceles triangle opposite to the base follows a rectilinear movement on the line of the main articulations, or parallel to this line, when one of the secondary bars, or the base, is animated by an alternating rotational movement.

The Klann mechanism is a planar mechanism designed to avoid an obstacle on a path, for example to simulate the pace of a legged animal and replace the wheel. The mechanism is composed by a leg which comes into contact with the ground, a crank, two lever arms, and two connecting rods, all connected by pivot connections. The proportions of each of the connections in the mechanism are defined to optimise the linear movement of the foot during half of the rotation of the crank. The remainder of the rotation of the crank enables the foot to be raised to a predetermined height before returning to the starting position and repeating the cycle. Two mechanisms coupled together to the crank and out of phase by half a cycle enable the chassis of a vehicle to move parallel to the ground. The kinematics of the Klann mechanism is based on mechanical connections which impart the relative movement to each of the bars. It converts the rotational movement into a linear movement. The document U.S. Pat. No. 6,260,862 describes such a mechanism. Although with a more complex kinematics than the mechanisms with three or four bars, and although requiring three levels, the Klann mechanism has the advantage of being able to generate a complex path guaranteeing the absence of collision with an obstacle, and that being so, in a perfectly repetitive way.

It should be understood that all these mechanisms have a common characteristic: at least one particular point always follows the same closed path, therefore according to a single degree of freedom along this path. More particularly, for some of them, at least one portion of this path is substantially linear, or linear. Often, the rest of the path is close to an arc of a circle, or of a parabola, or the same.

The invention suggests using the properties of some of these mechanisms for controlling some horological functions, in particular display functions. Indeed, modern micromachining techniques and the implementation of "LIGA", "MEMS" or similar type processes allow obtaining monolithic components grouping together complex functions, and in particular within oscillators. The rotary connections, such as ball-joint connections or pivots, of conventional mechanics could be replaced, in these monolithic structures as used in watchmaking, by necks which provide enough angular freedom from one bar relative to another, in the same plane.

Many of the above-described mechanisms are well suited for a planar execution, which is advantageous in watchmaking technique. Other mechanisms, driven in rotation continuously or not, require a crank in a secondary plane, which is parallel to a main plane in which all of the articulations other than those of the crank are located. Other ones require more levels, like the Klann mechanism illustrated in FIG. 16; the overall bulk nevertheless remains limited, and remains compatible with making of a horological complication.

Thus, the invention relates to a linkage mechanism 100 for a horological mechanism, arranged for a movement transmission between an actuator and a receiver.

According to the invention, this linkage mechanism 100 includes a fixed structure 10, relative to which a carrier 9 is movable according to a single degree of freedom under the action of such an actuator, this carrier 9 being connected to the fixed structure 10 by at least one flexible guide 50, each of said carrier 9 and said fixed structure 10 being more rigid than each flexible guide 50.

More particularly, this carrier 9 is movable according to a single degree of freedom, other than a pivoting one, and so that each point of this carrier 9 follows a path other than circular.

The carrier 9 moves under the effect of the actuator, guided according to the degree of freedom only by the flexible guide 50. In particular, when the carrier does not transmit any movement to the receiver, only the flexible guide 50 enables the carrier 9 to follow the degree of freedom. In other words, no other portion of the linkage mechanism 100 or of the horological mechanism acts on the carrier 9 to make it follow the degree of freedom. The actuator just provides the actuation force to the carrier 9, and the flexible guide 50 orients the carrier 9 along the degree of freedom.

When the carrier 9 is in contact with the receiver to transmit the movement thereto, the receiver does not affect the degree of freedom defined by the flexible guide 50. Thus, the receiver does not act on the unique degree of freedom.

By its flexibility, the flexible guide 50 defines the pathway that the carrier 9 follows, and which corresponds to the unique degree of freedom. For example, the unique degree of freedom is a closed pathway around a surface or a volume, which is preferably partially curvilinear. More particularly, the carrier 9 is connected to the fixed structure 10 by a plurality of flexible guides 50.

More particularly, the only connections between the carrier 9 and the fixed structure 10 are of the flexible guide type:

the carrier 9 is connected to the fixed structure 10 only by a flexible guide 50 or several flexible guides 50.

More particularly, at least one flexible guide 50 is planar, and includes flexible necks 51, with a smaller section than the elements that are adjacent thereto, and forming articulations, and/or includes flexible blades 5, 6, 52, with a smaller section to the elements that are adjacent thereto, and forming articulations. The figures illustrate, without limitation; straight flexible blades, it is clear that these flexible blades could be curved, bent, or else adopt complex shapes, for example zig-zag like or other.

Even more particularly, each flexible guide 50 is planar, and includes flexible necks 51, with a smaller section than the elements that are adjacent thereto, and forming articulations, and/or includes flexible blades 5, 6, 52, with a smaller section than the elements that are adjacent thereto, and forming articulations.

And in particular, this linkage mechanism 100 includes at least two arms 1 and 2, which are articulated to the structure 10 at two distinct points, these arms 1 and 2 being arranged to kinematically cooperate with each other, or with a tertiary bar 12 or a tertiary structure 120, such as a non-deformable triangle 121, or a deformable quadrilateral 122, or other. Advantageously, this tertiary bar 12 or this tertiary structure 120 forms this carrier 9.

Figure 5:
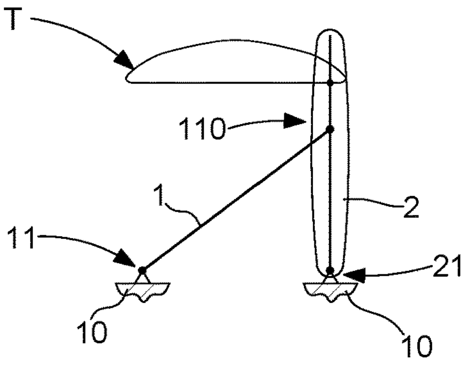
FIG. 5 represents, in a way similar to FIG. 1, another linkage mechanism called Chebyshev linkage, which includes only three bars (including the fixed structure), the two arms which are articulated to the fixed structure cooperating with each other by a slide connection, so that a particular point of the arm carrying the slide follows a substantially linear path over a portion of its stroke, and a clear curved path over the remainder of its stroke when returning to the beginning of its linear path.
Figure 6:
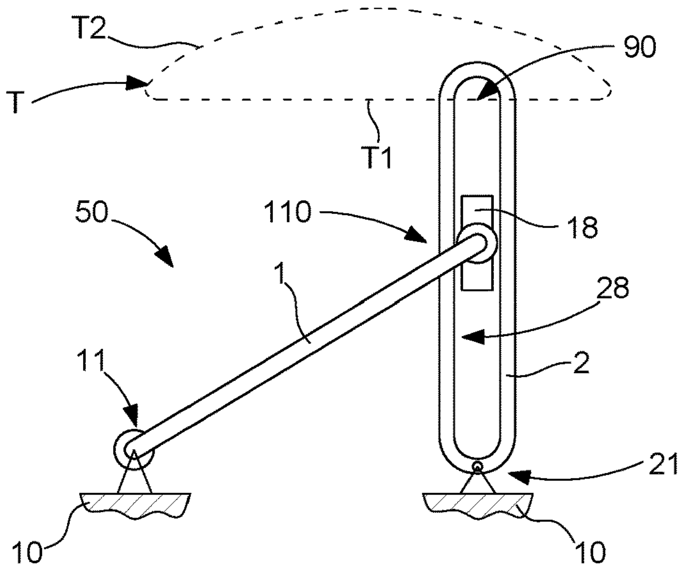
FIG. 6 is a detail of a pad-slide connection of such a Chebyshev linkage.
Figure 7:
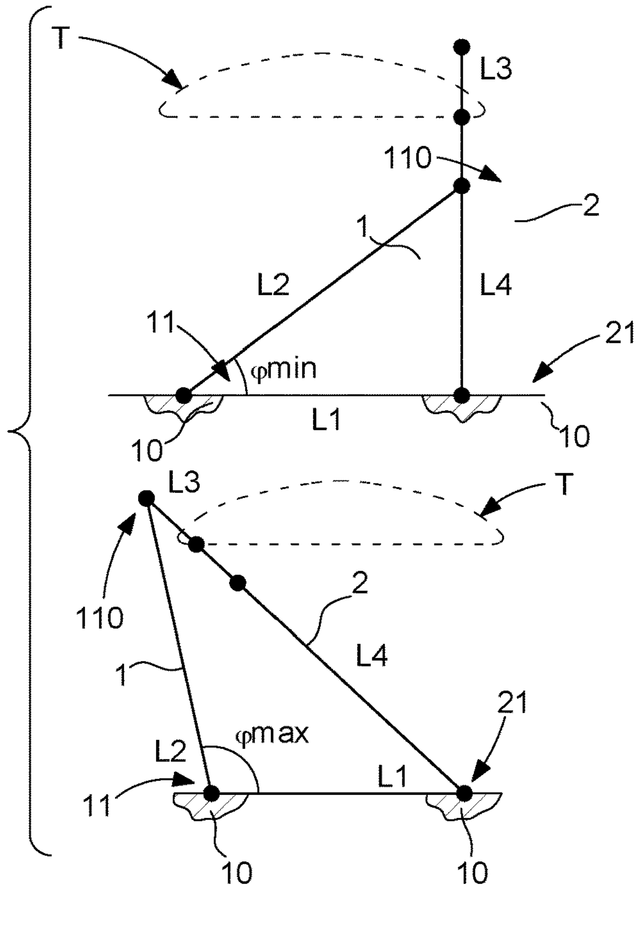
FIG. 7 illustrates the two extreme positions of this Chebyshev linkage.

The linkage mechanism 100 includes a first main articulation 11 between the structure 10 and a first arm 1, and a second main articulation 21 between the structure 10 and a second arm 2, and:

- either the first arm 1 includes, at a distance from the first main articulation 11, a translational guide with flexible connections or a sliding element 18 arranged to cooperate slidably and in an articulated manner with a complementary sliding element 28 which includes, at a distance from the second main articulation 21, the second arm 2 forming the carrier 9, as shown in FIGS. 5 to 7;
- or the linkage mechanism 100 includes, at a distance from the first main articulation 11, a first secondary articulation 110 between the first arm 1 and the carrier 9, and, at a distance from the second main articulation 21 and from the first secondary articulation 110, a second secondary articulation 210 between the second arm 2 and the carrier 9, or between the second arm 2 and an operating bar 4 articulated with the carrier 9.

FIG. 6 illustrates the first case, with a slide between two arms, where the first arm 1 includes, at a distance from the first main articulation 11, a sliding element 18 arranged to cooperate slidably and in an articulated manner with a complementary sliding element 28 that includes, at a distance from the second main articulation 21, the second arm 2 forming the carrier 9.

Figure 8:
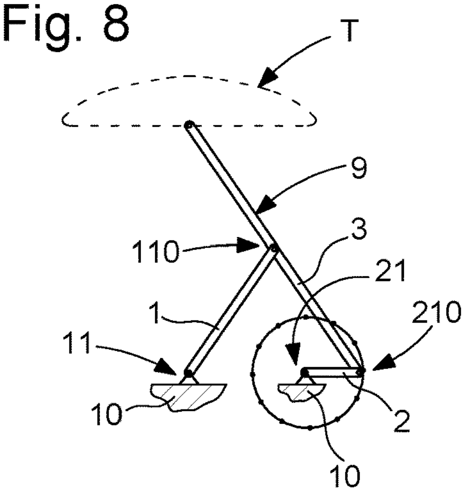
FIG. 8 represents, in a way similar to FIG. 5, another linkage mechanism which is a development of Chebyshev linkage, and is called Chebyshev lambda mechanism, and which includes four articulated bars, a bar articulated to the fixed structure and articulated at one end of the arm carrying the slide acting as a crank, the other end of the arm carrying the slide describing a similar path, with a substantially linear portion.
Figure 9:
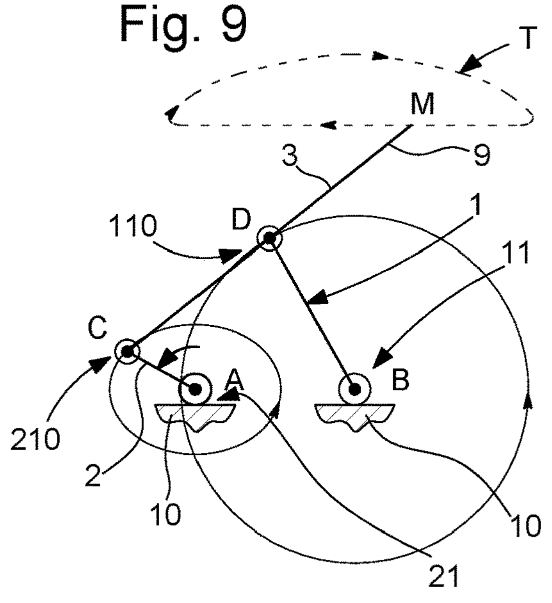
FIG. 9 represents the mechanism of FIG. 8, in another position.
Figure 10:
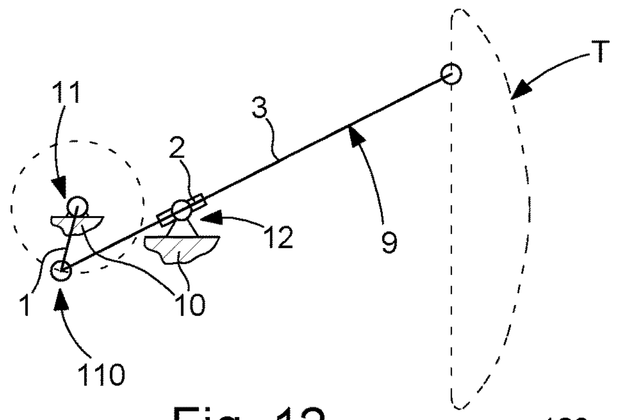
FIG. 10 represents, in a way similar to FIG. 1, another three-bar linkage mechanism (including the fixed structure), so-called Hoeckens mechanism, wherein a first articulation to the fixed structure carries a connecting rod, driven in a circular movement, and which is articulated with a long bar which slides in a slide which is itself articulated at a second point of the fixed structure.

FIG. 8 illustrates the second case, where the linkage mechanism 100 includes, at a distance from the first main articulation 11, a first secondary articulation 110 between the first arm 1 and the carrier 9, and, at a distance from the second main articulation 21 and from the first secondary articulation 110, a second secondary articulation 210 between the second arm 2 and the carrier 9, or between the second arm 2 and an operating bar 4 articulated with the carrier 9. At least one of the articulations, such as the first main articulation 11 and the second main articulation 21, in the case of this figure, could be a pivot connection which enables a 360° rotation, and which then requires an implementation by a conventional guide, not being feasible in flexible guidance.

Figure 43:
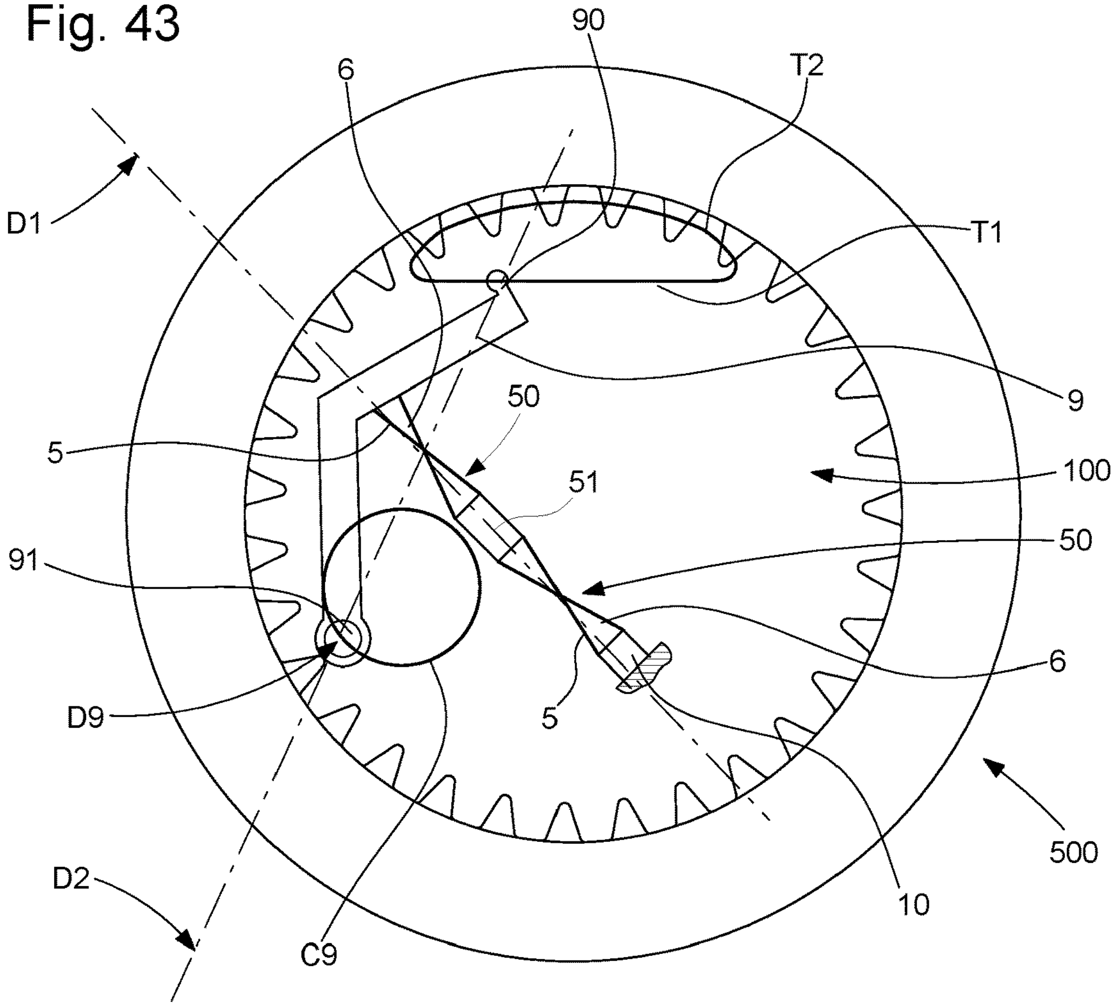
FIGS. 43 to 54 illustrate, in a schematic, partial and in planar way, another application of a Chebyshev lambda mechanism to the display of a date, the carrier including at its distal end a finger arranged for driving a date ring with conventional internal toothing, held in position by a chain which is not illustrated.
Figure 44:
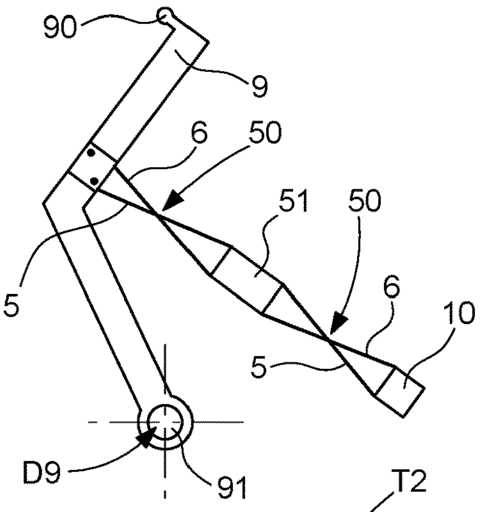
Figure 45:
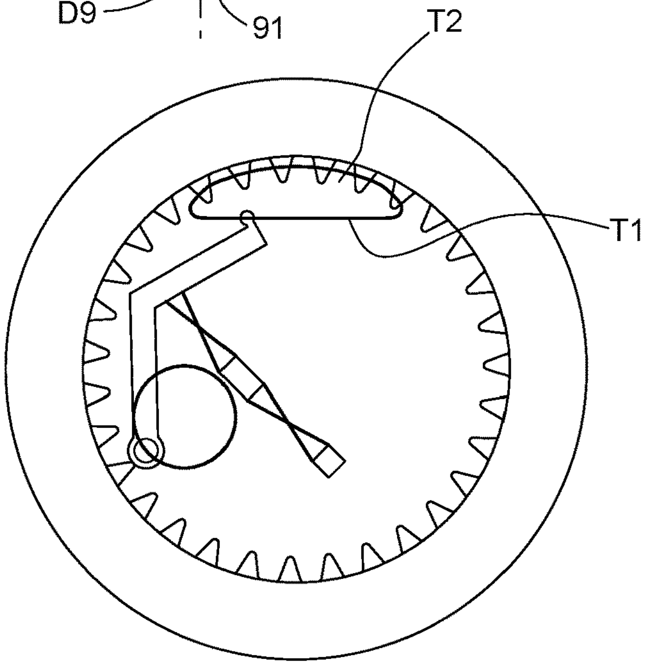
Figure 46:
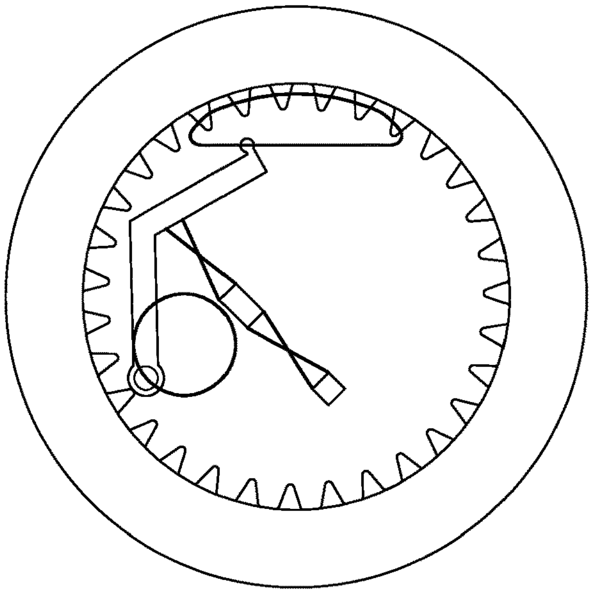
Figure 47:
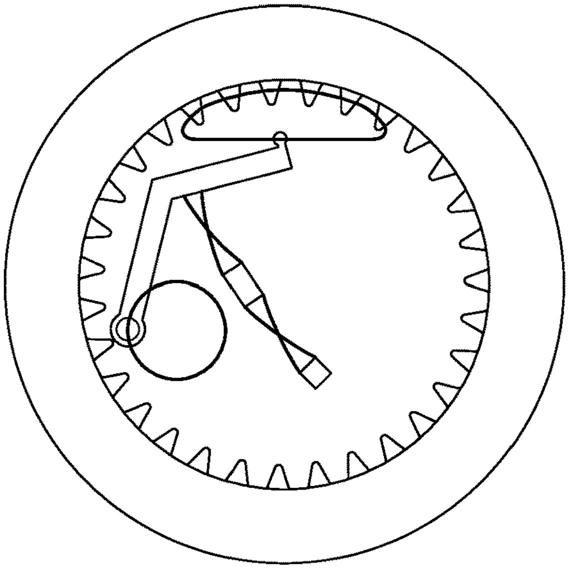
Figure 48:
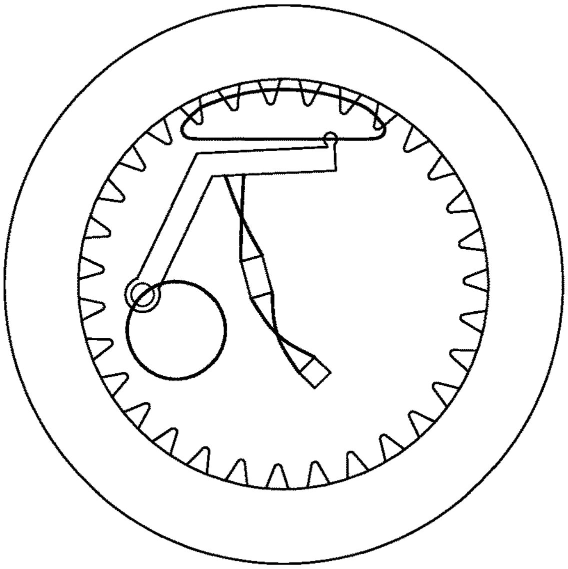

In one variant, the kinematics according to Chebyshev lambda mechanism is ensured by a substitute for conventional articulations: FIG. 43 thus illustrates a linkage mechanism 100, which includes two flexible guides 50 disposed in series between the carrier 9 and the structure 10, and which are separated by an intermediate inertial mass 51 to which they are both fastened or with which they form a monolithic assembly. Each flexible guide 50 includes two flexible blades 5 and 6, disposed in two parallel planes, and which intersect in projection on one of these planes; in planar projection, a first direction D1 is defined by the alignment of these crossing points, and a second direction D2 is defined by the alignment between, on the one hand the pivot with the axis D9 at the end of a non-represented crank which forms the second arm 2 of FIG. 8, and on the other hand a distal end 90 of the carrier 9: the crossing of the flexible blades 5 and 6 the furthest from the structure 10, and the closest to the carrier 9 is equivalent to the first secondary articulation 110 between the first arm 1 and the carrier 9; it corresponds to the intersection of the directions D1 and D2.

Figure 13:
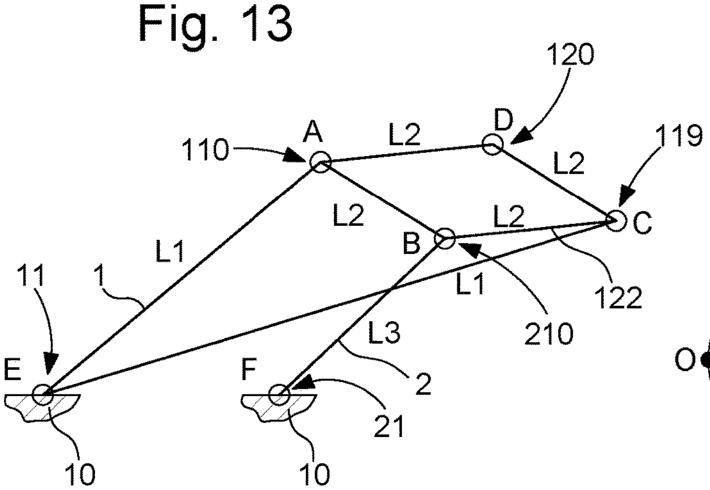
FIG. 13 represents, in a way similar to FIG. 1, another linkage mechanism, called Peaucellier-Lipkin mechanism, known for reaching a path very close to a line, including eight bars: the fixed structure carries, at a first multiple articulation, two first arms with the same length, the opposite ends of which are articulated to two opposite vertices of a regular deformable rhombus, another vertex of which is articulated to a second arm articulated to the fixed structure at a second articulation.
Figure 14:
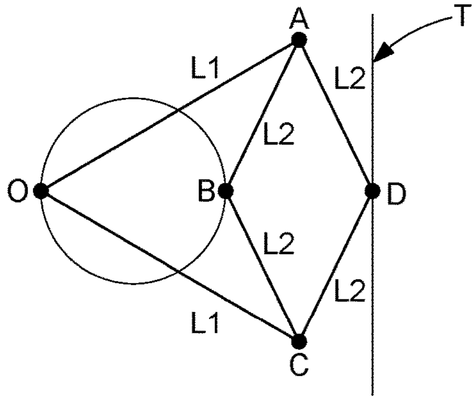
FIG. 14 and FIG. 15 partially illustrate, in particular positions, the mechanism of FIG. 13.
Figure 15:
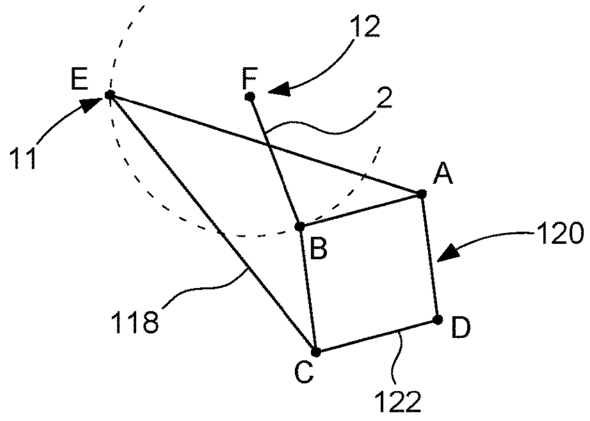

In one variant, as shown in FIGS. 13 to 15, the linkage mechanism 100 forms a Peaucellier-Lipkin mechanism, and the same articulation carries several arms, herein the first articulation 11 carries two first arms 1 and 118.

In one variant, as shown in FIGS. 5 to 7, the linkage mechanism 100 forms a Chebyshev linkage, and the first arm 1 includes a sliding element 18, which is arranged to slidably cooperate with a complementary sliding element 28 that the second arm 2 carries.

In different variants, and in particular those illustrated by FIGS. 1, 2, 4, 8, 9, 11 to 15, the linkage mechanism 100 includes, at a distance from the first main articulation 11, a first secondary articulation 110 between the first arm 1 and the carrier 9, and, at a distance from the second main articulation 21 and from the first secondary articulation 110, a second secondary articulation 210. This second secondary articulation 210 is arranged between the second arm 2 and the carrier 9, or between the second arm 2 and an operating bar 4 articulated directly or indirectly with the carrier 9 like in the variant of FIG. 16 forming a Klann mechanism.

Figure 16:
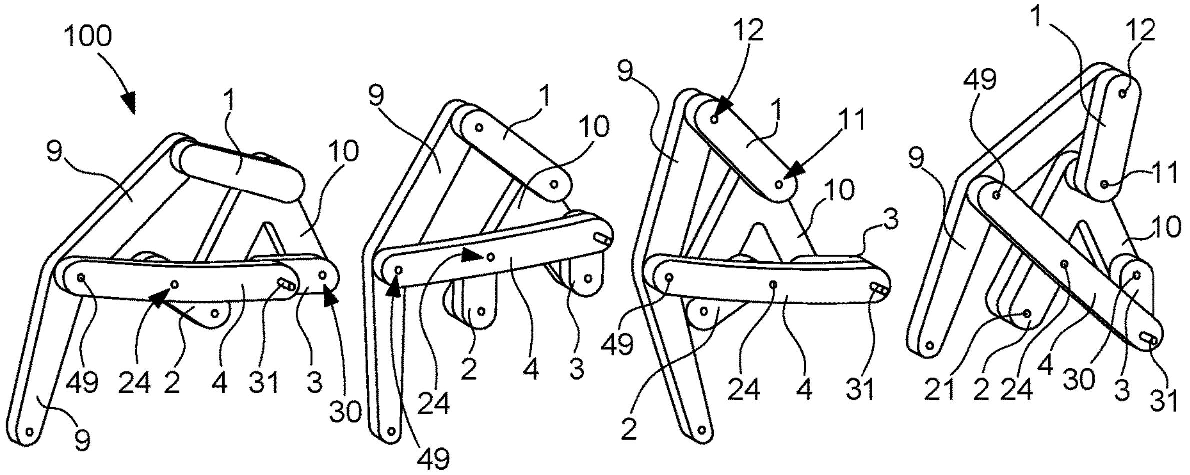
FIG. 16 represents, schematically and in perspective, another linkage mechanism, called Klann mechanism, which has the advantage of being able to replicate complex paths such as the walking movement of a human being; this mechanism herein includes six bars, which extend over three parallel levels, and which are articulated to each other by seven articulations; this mechanism therefore allows avoiding an obstacle on the path.
Figure 17:
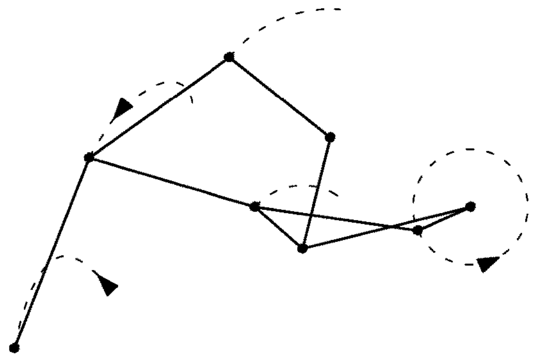
FIG. 17 and FIG. 18 partially illustrate, in planar view, in particular positions, the mechanism of FIG. 16.
Figure 18:
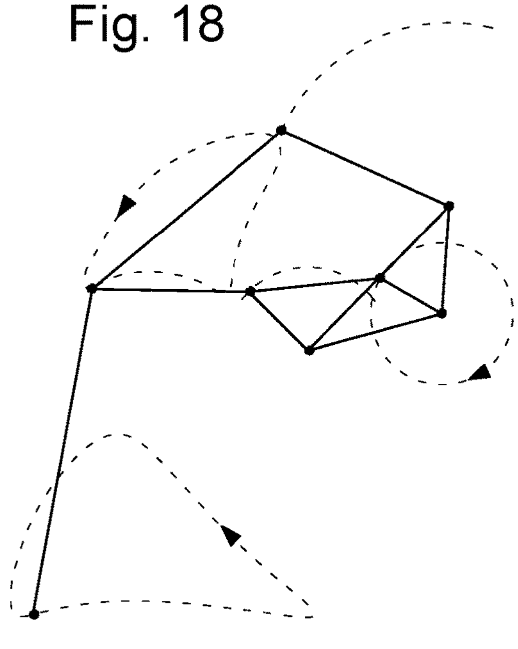

In this variant of FIG. 16, the operating bar 4 is articulated respectively at a first operating articulation 24 with the second arm 2, and at a second operating articulation 49 with the carrier 9. And the structure 10 includes a pivot 30 arranged to guide in rotation a third bar 3, which is articulated, at a third secondary articulation 31 distant from the pivot 30, with the operating bar 4.

In one variant, at least one flexible guide 50 includes at least two parallel planar levels, and includes in each level flexible blades 5, 6, 52, with a smaller section than the elements that are adjacent thereto, and whose directions are crossed and whose projection, on a plane parallel to the levels, of the intersection of these directions defines a virtual pivot axis and an articulation, as shown in FIGS. 43 to 54.

More particularly, the carrier 9, the structure 10, and at least one flexible guide 50 are coplanar. Even more particularly, the carrier 9, the structure 10, and each flexible guide 50 are coplanar.

In one variant, the carrier 9 is a third bar.

Figure 11:
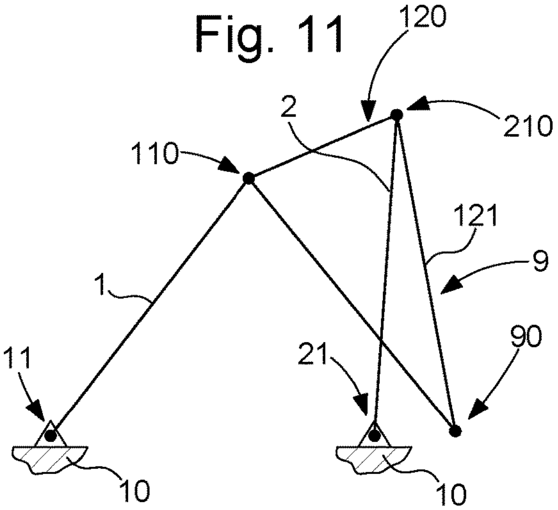
FIG. 11 represents, in a way similar to FIG. 1, another linkage mechanism, called Roberts mechanism, with five bars, three of which form a non-deformable isosceles triangle; the tertiary bar is the base of this isosceles triangle, whose two sides have the same length as the arms articulated to the fixed structure, and the vertex of this isosceles triangle opposite to the base follows a rectilinear movement over the line of the main articulations, when one of the secondary arms, or the base, is animated, or animated, by an alternating rotational movement.
Figure 12:
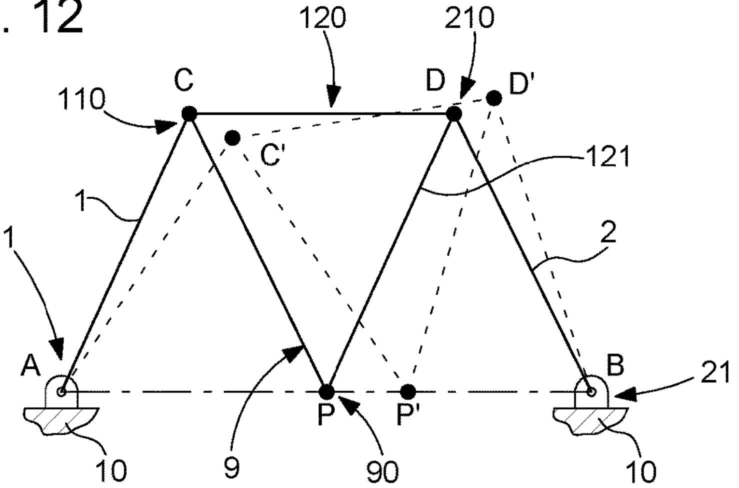
FIG. 12 represents, in a way similar to FIG. 11, such a Roberts mechanism in two different positions.

In one variant, the carrier 9 is a polygonal rigid structure, like in the embodiment of FIGS. 11 and 12 where the linkage mechanism 100 forms a Roberts mechanism, with a non-deformable structure 120 which is formed by an isosceles triangle 121.

In an advantageous variant, the carrier 9 includes, at a distal end 90, a hook or a finger or a tooth for driving a receiver.

In many variants, the first arm 1 or the second arm 2 is arranged to be driven by an actuator. But the drive by the actuator could also be done at an intermediate bar of the linkage mechanism 100.

In a particular variant of a Klann mechanism, the third bar 3 is arranged to be driven by an actuator.

More particularly, and as shown in FIG. 43, the linkage mechanism 100 includes at least one plurality of flexible guides 50 disposed in series between the carrier 9 and the structure 10, and at least two successive flexible guides 50 of which are separated by an intermediate inertial mass 51 to which they are both fastened or with which they form a monolithic assembly.

Figure 19:
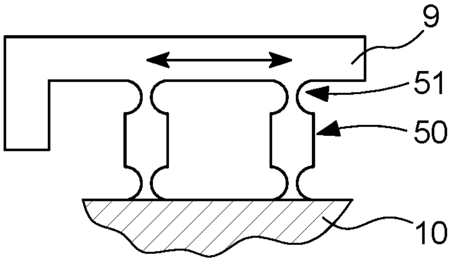
FIG. 19 represents, in a way similar to FIG. 1, a mechanism for translation guidance with flexible collar connections, each of the two arms being connected by necks to the fixed structure on the one hand, and to a L-shaped tertiary bar on the other hand.
Figure 20:
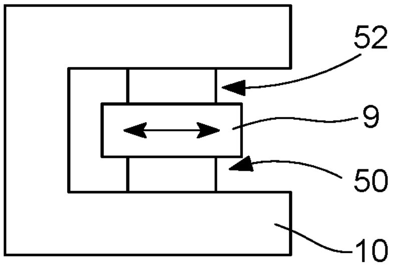
FIG. 20 represents, in a way similar to FIG. 1, a mechanism for translation guidance with flexible connections by flexible blades, where the U-shaped fixed structure carries a mass by means of four flexible blades, herein straight and parallel to each other.
Figure 21:
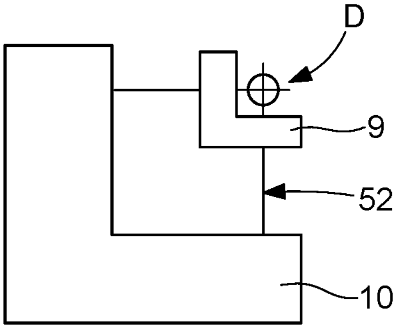
FIG. 21 represents, in a way similar to FIG. 1, a so-called RCC (standing for remote centre compliance) guide mechanism with two flexible blades, wherein the intersection of the directions of the two blades defines a virtual pivot axis, also called offset axis, of an L-shaped mass suspended by these two blades to the fixed structure herein also L-shaped.
Figure 22:
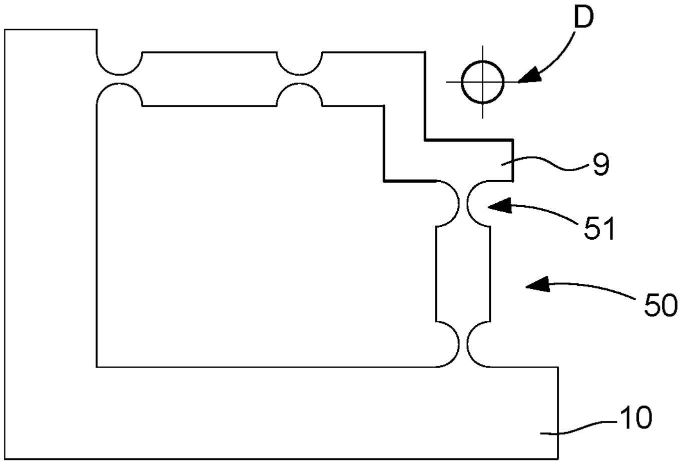
FIG. 22 represents, in a way similar to FIG. 11, a so-called RCC guide mechanism with four necks, including a fixed structure herein L-shaped, which carries, according to two intersecting directions, via necks, arms which are connected by other necks to a suspended mass, herein also L-shaped, and wherein the intersection of the directions of the two series of necks, which are aligned in pairs, defines a virtual pivot axis, also called offset axis, of the suspended mass.

More particularly, at least one flexible guide 50 includes a pivot with two separate crossed blades, or a pivot with two integral crossed blades, or an RCC pivot with two orthogonal blades, or an RCC pivot with 4 necks, or at least two blades at least locally parallel, or a translational guide with flexible collar connections. A linear flexible guide of the type of FIG. 19 allows achieving a friction-less slide.

More particularly, the linkage mechanism 100 is a composite mechanism including at least one flexible guide 50 made of silicon and/or silicon oxide, or of a micro-machinable material shaped by a "LIGA" or "MEMS" or process or the same, this flexible guide being mechanically fastened to the carrier 9 and to the structure 10 by a pinned and/or screwed and/or glued and/or pinched connection, or another mechanical connection known to the watchmaker.

More particularly, the linkage mechanism 100 is a monolithic mechanism.

Advantageously, the path T of the distal end 90 includes at least one linear or substantially linear section T1. More particularly, the entire path T of the distal end 90 is linear or substantially linear. More particularly, the path T of the distal end 90 forms an eight-light shape, which could be very flattened, depending on the lever arms imposed on the linkage mechanism, and the crossing portion of the loops of the eight-light shape is very close to a linear stroke.

More particularly, the path T of the distal end 90 includes a linear or substantially linear section corresponding to a first stroke T1 of the distal end 90 in a first direction, and a concave curve joining the ends of the section and corresponding to a second stroke T2 of the distal end 90 in the second direction opposite to the first direction.

The invention also relates to a horological mechanism 500, including an actuator and a receiver, and at least one such linkage mechanism 100, arranged for a movement transmission between the actuator and the receiver.

In one variant, the carrier 9 is arranged to drive a receiver by direct contact, or through a push-piece or a lever, in particular by its distal end 90.

In one variant, the actuator is arranged to exert a continuous force on the linkage mechanism 100, over the entirety of a control stroke, for an adequate stroke of the receiver.

In one variant, the actuator is arranged to exert an impulse on the linkage mechanism 100, to transmit an adequate impulse to the receiver.

In one variant, the actuator is secured to one of the elements of a flexible guide 50 or articulated with one of the elements of a flexible guide 50.

Figure 23:
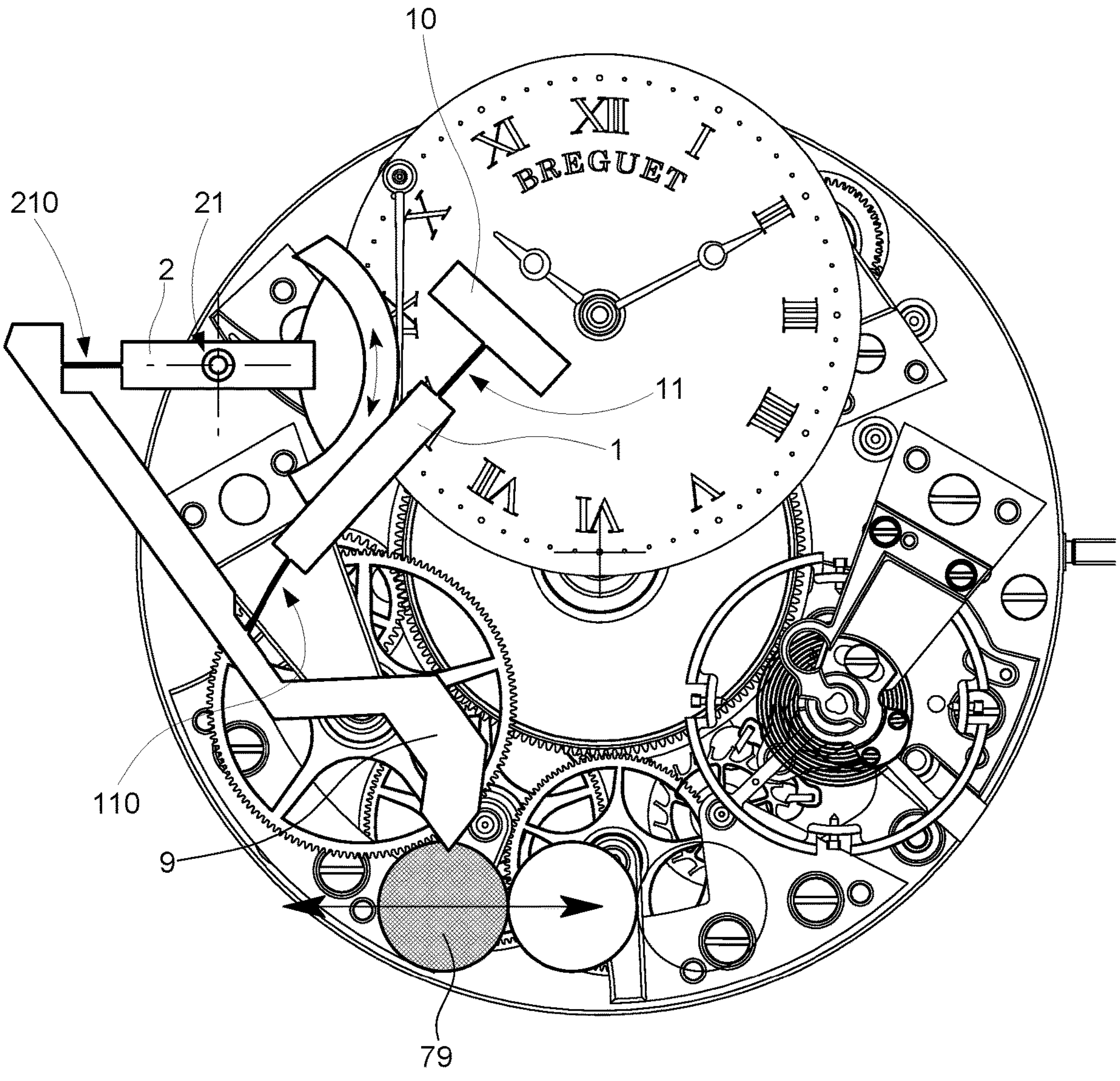
FIGS. 23 to 28 illustrate, in a schematic, partial and in planar way, the application of a Chebyshev lambda mechanism, the principle of which is illustrated in FIGS. 8 and 9, to the retrograde display of a lunar phase, the tertiary arm is a carrier which carries at its distal end a dark disc able to conceal a clear representation of the moon, in a progressive and linear manner, under the action of a rotation control herein located at ten o'clock of a watch; the carrier is suspended by a first flexible blade from a first rotary arm, and by a second flexible blade from a second arm which is itself suspended by a third flexible blade, substantially aligned with the second flexible blade, to the structure of a watch.
Figure 24:
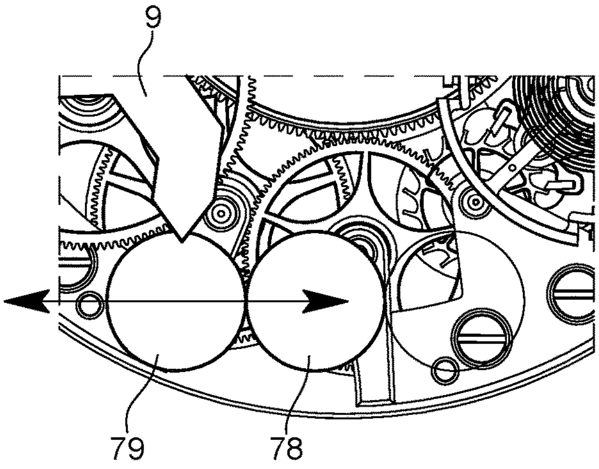
Figure 25:
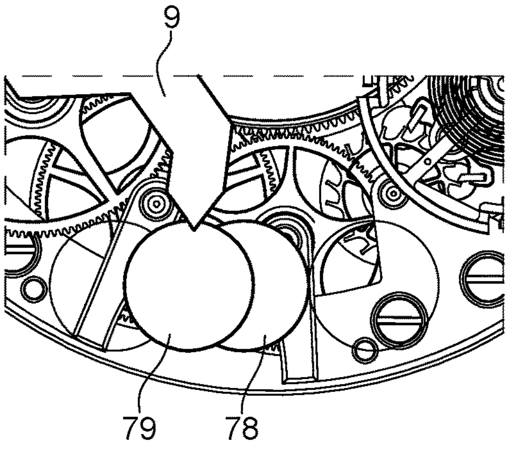
Figure 26:
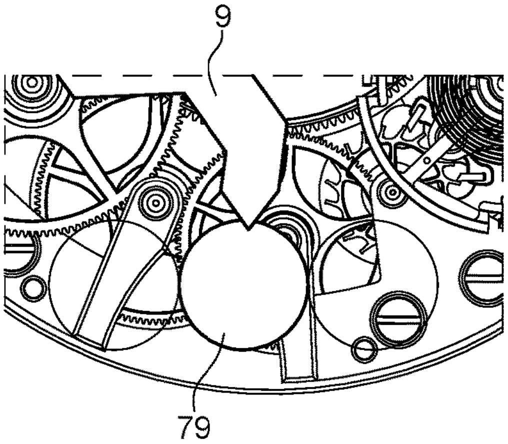
Figure 27:
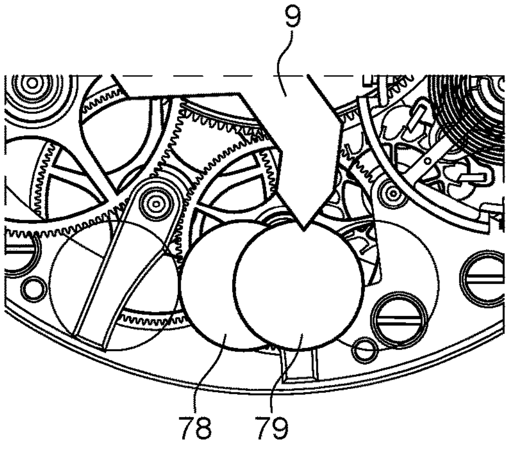
Figure 28:
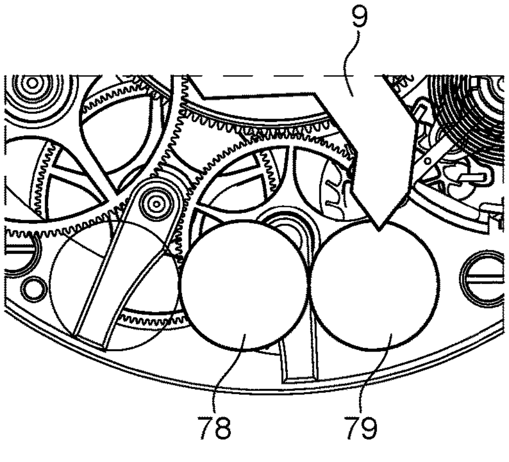
Figure 29:
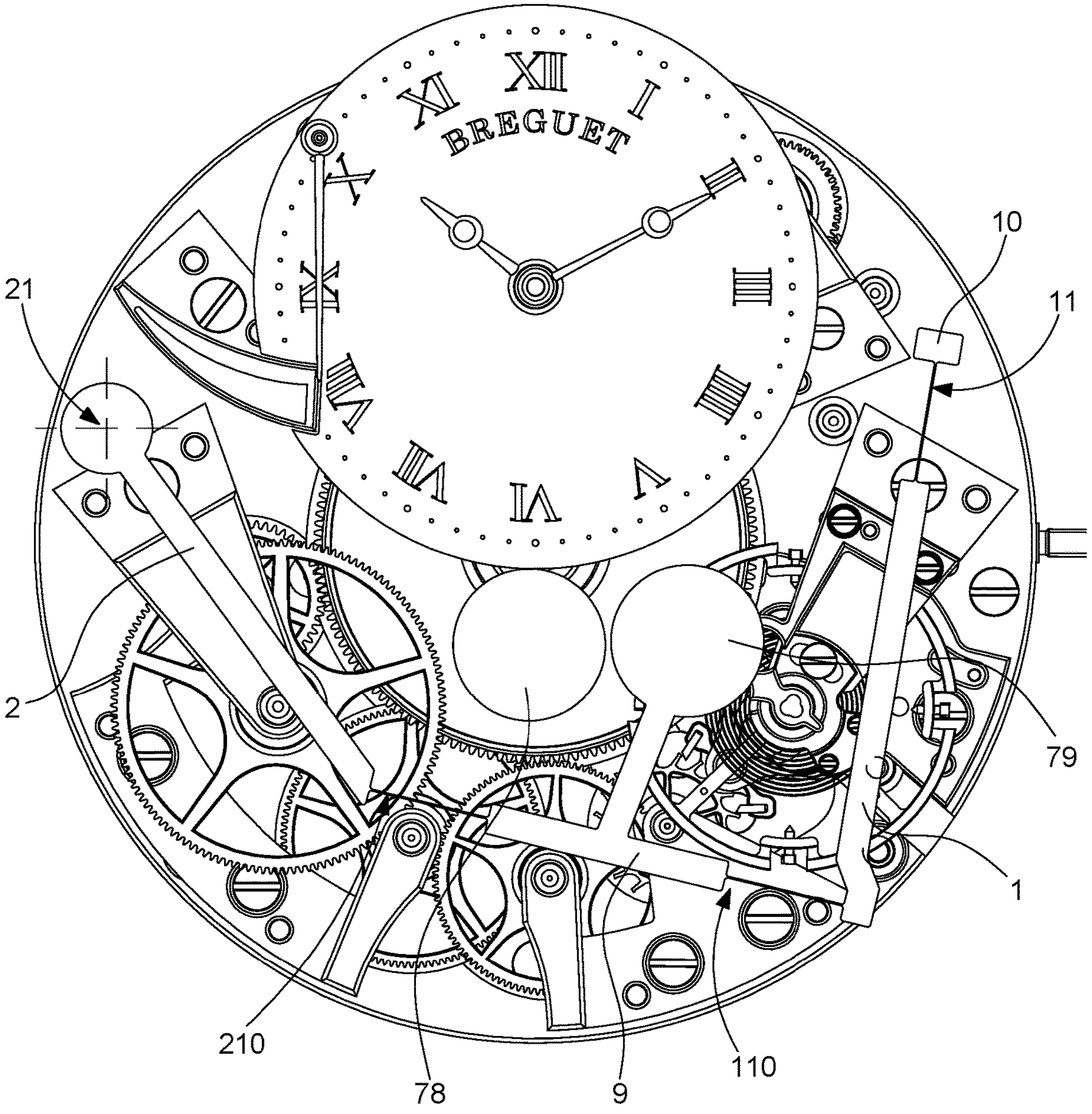
FIGS. 29 to 41 illustrate, in a way similar to FIGS. 23 to 28, another application of a Roberts mechanism, for another similar retrograde lunar phase display mechanism in the northern hemisphere, where the carrier is this time suspended between two flexible blades, substantially aligned, with both arms.
Figure 30:
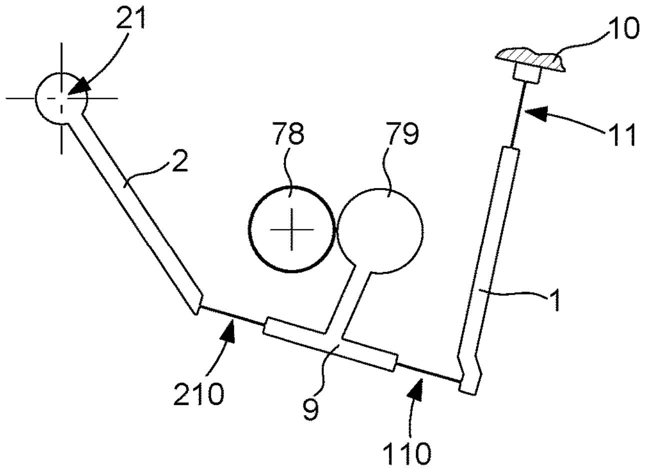
Figure 31:
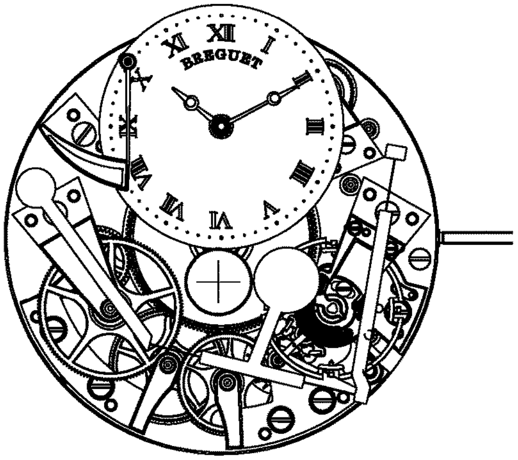
Figure 32:
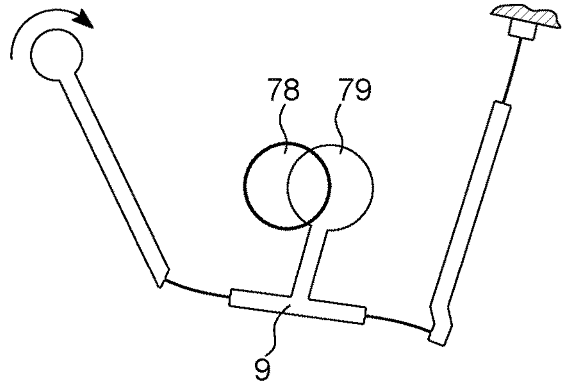
Figure 33:
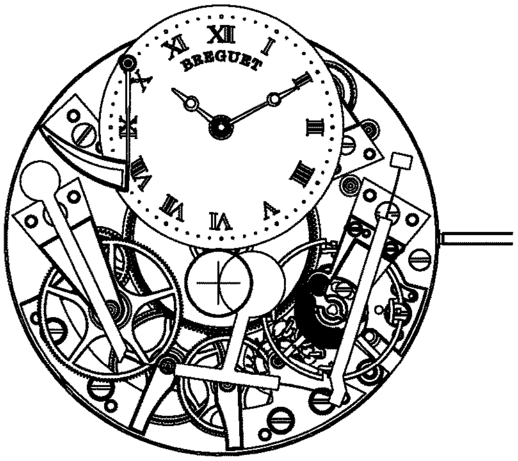
Figure 34:
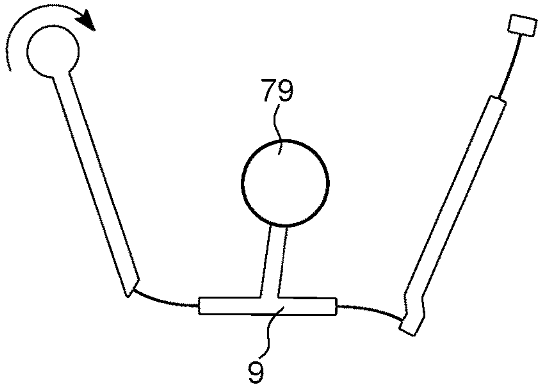
Figure 35:
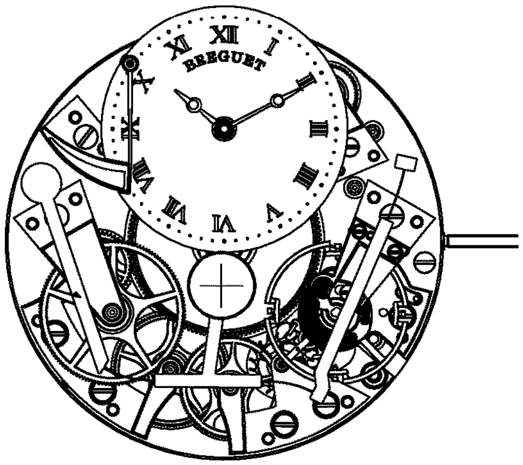
Figure 36:
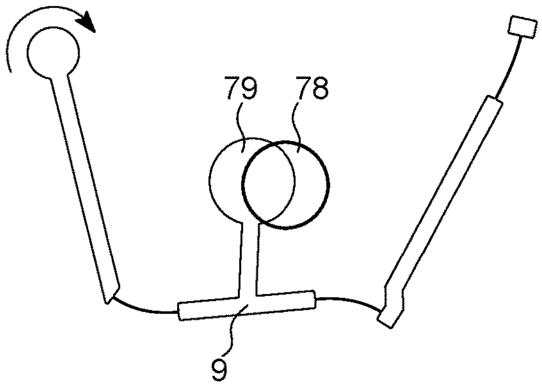
Figure 37:
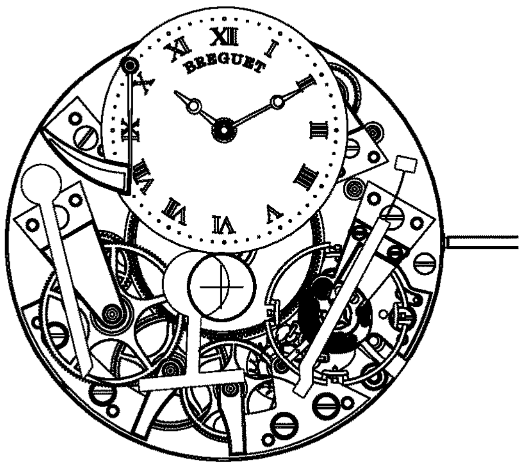
Figure 38:
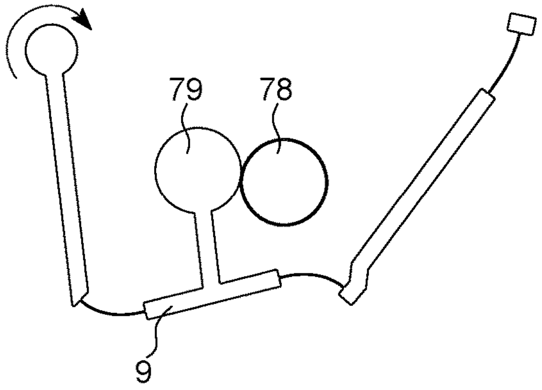
Figure 39:
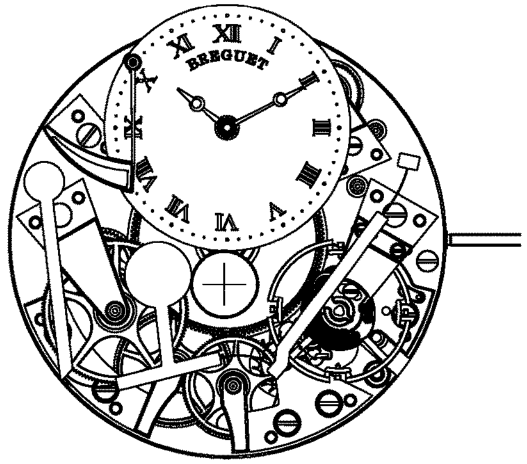
Figure 40:
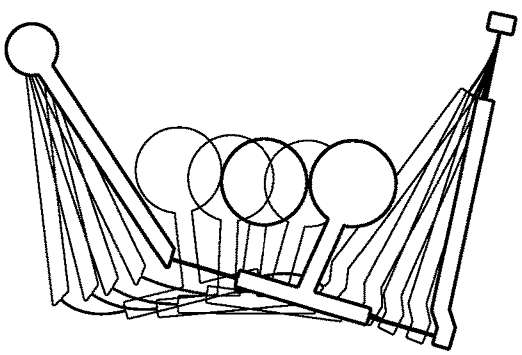
Figure 41:
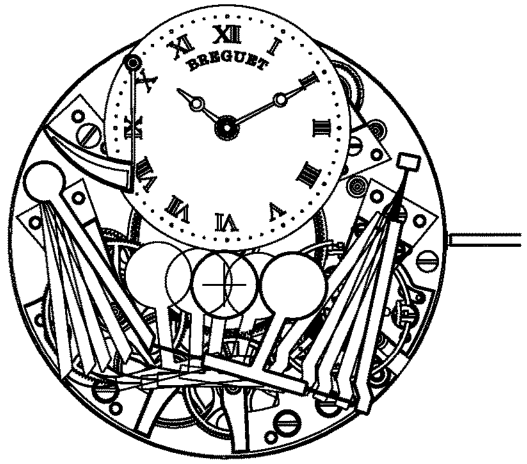
Figure 42:
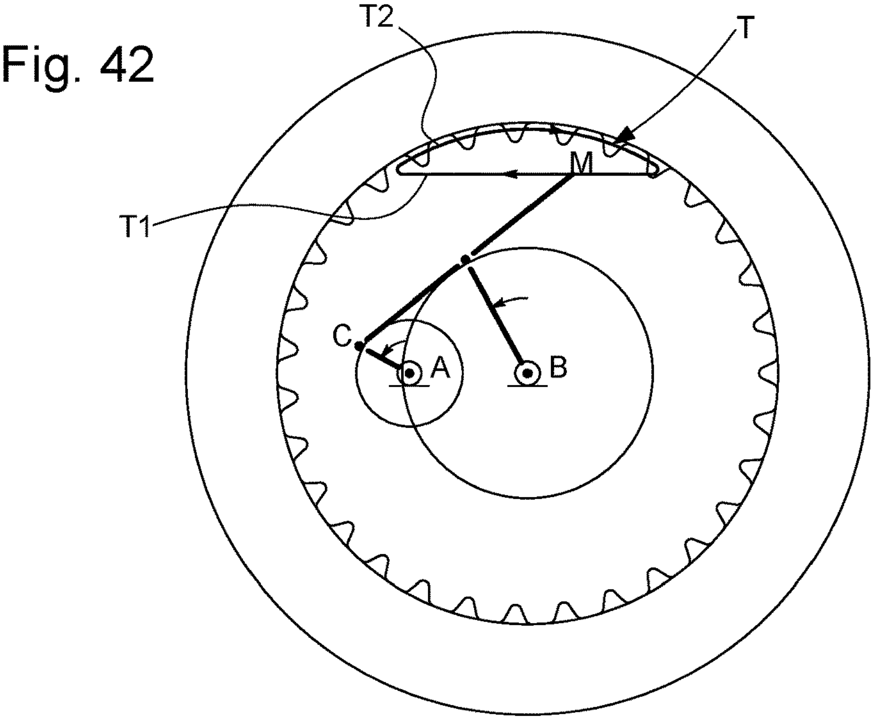
FIG. 42 illustrates proportions allowing obtaining a straight path T1: the distance between the two articulations of the fixed structure is twice the length of the crank between its articulations, and the middle articulation of the carrier is far from its articulation with the crank two and a half times the length of the crank between its articulations, and the distal end of the carrier, which describes this linear path, is away from the middle articulation of the carrier by two and a half times the length of the crank between its articulations, this distal end being aligned with the two articulations of the carrier.
Figure 56:
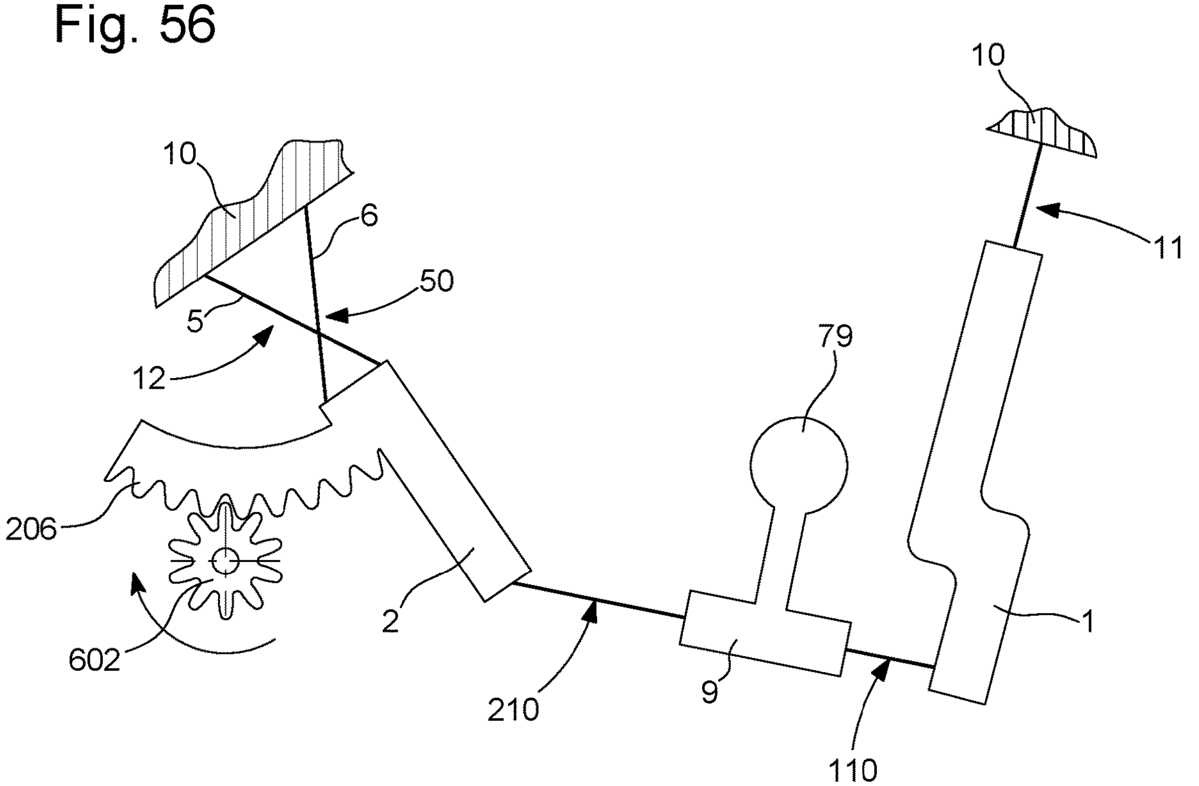
FIGS. 56 and 57 respectively show a rake drive mechanism and a cam drive mechanism.
Figure 57:
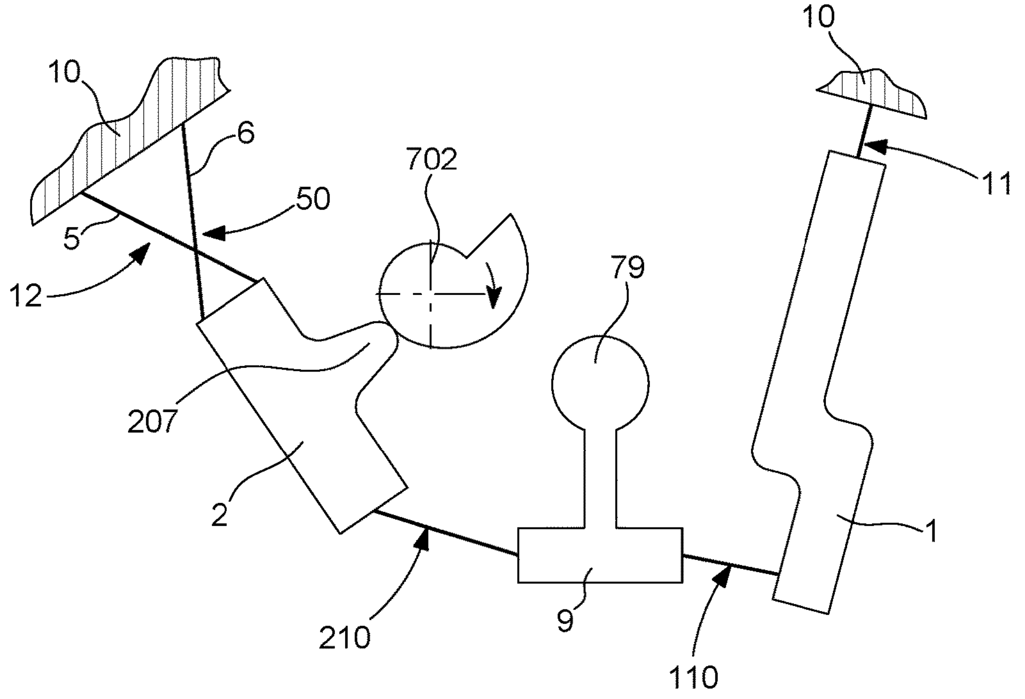

The actuator may be in different forms:

- a rotational drive mechanism, in particular an element of a geartrain (for example in FIGS. 23 and 30), in particular for a crank-type drive, for example in FIGS. 43 to 54;
- a rake drive mechanism, as shown in FIG. 56, with a wheel 602 cooperating with a toothed sector 206 that the second arm 2 includes;
- a cam drive mechanism, as shown in FIG. 57, with a cam 702 cooperating with a probe finger 207 that the second arm 2 includes.

In a particular embodiment, the linkage mechanism 100 is a Hoeckens mechanism arranged to transform a rotation imparted by the actuator into a linear retrograde movement of the receiver.

In a particular embodiment, the linkage mechanism 100 is a Roberts mechanism arranged to transform a rotation imparted by the actuator into a linear retrograde movement of the receiver, the distal end 90 of the carrier 9 being a vertex of a triangle 121 whose other vertices are articulated to articulated arms 1, 2, that the linkage mechanism 100 includes.

Figure 55:
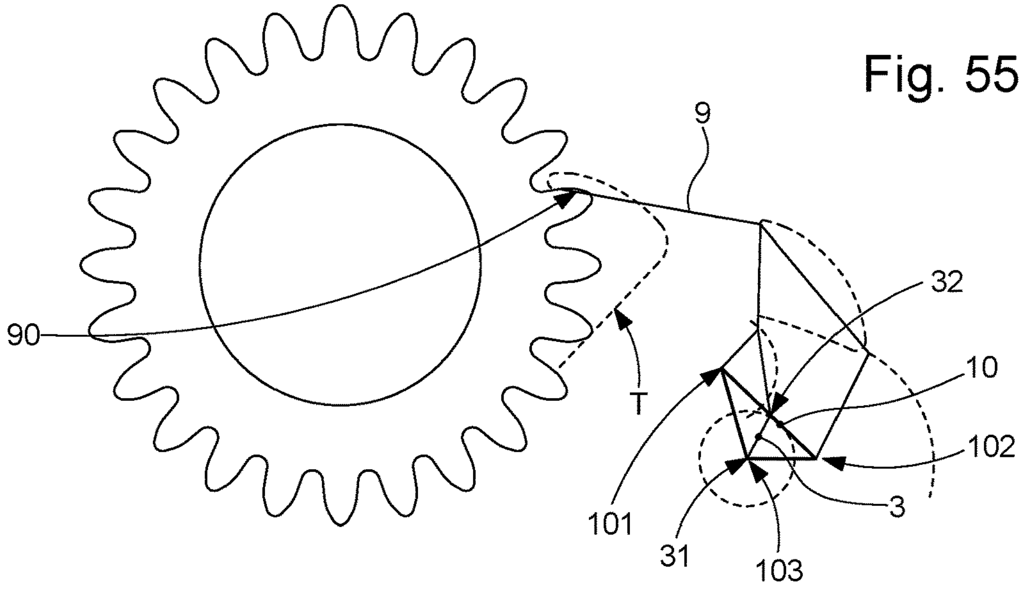
FIG. 55 illustrates, in a schematic, partial and planar way, the application of a Klann mechanism, as illustrated in FIG. 16, to driving of an external toothing, for example of a display wheel or of an automatic winding wheel, with the distal end of the carrier which is arranged to penetrate substantially radially between two teeth, then to drive a tooth sidewall during the linear path, then escape the toothing according to a curved path largely circumventing the toothing before returning to a drive position.

In a particular embodiment, the linkage mechanism 100 is a Klann mechanism arranged to transform a continuous rotation imparted by the actuator into a periodic drive push on a toothing or a bearing surface that the receiver includes. FIG. 55 illustrates such an example, a triangular fixed structure 10 includes three articulations 101, 102, 103; a third bar 3 is articulated at a first end 31 to the articulation 103, and its second end 32 is driven in a circular movement. The particular kinematics imparts a path T substantially at a right angle which enables the distal end 90 to circumvent, without touching it, a tooth of a wheel, to push it at the end of the cycle.

In a particular embodiment, the linkage mechanism 100 is a Chebyshev lambda mechanism arranged to transform a continuous rotation imparted by the actuator into a periodic drive push on a toothing or a bearing surface that the receiver includes.

In a particular embodiment, the linkage mechanism 100 is a Chebyshev linkage mechanism arranged to transform a rotation imparted by the actuator into a linear retrograde movement of the receiver.

The invention also relates to a horological movement 1000, including at least one such horological mechanism 500, and/or at least one such linkage mechanism 100.

The preferred embodiment of these mechanisms includes flexible guides 50, the horological mechanism 500 or the linkage mechanism 100 may of course also include at least one conventional rotational or translational guide.

The invention also relates to a watch 2000, including at least one such horological movement 1000, and/or at least one such horological mechanism 500, and/or at least one such linkage mechanism 100.

FIGS. 23 to 28 illustrate a first application of the invention, using a linkage mechanism including flexible guides, for a retrograde display, wherein a rotation is transformed into a linear movement of a lunar phase shutter 79, progressively covering or uncovering a clear representation 78 of the moon.

FIGS. 29 to 41 illustrate a mechanism arranged differently, for the same application. These two non-limiting examples prove that the invention allows overcoming the geometrical obstacles inside the horological movement, because these mechanisms, which, without limitation, are herein monolithic, allow circumventing the other constituents of the watch, and taking advantage of the smallest available space.

In the same manner, it is easy to implant a Roberts mechanism according to FIG. 12.

FIGS. 42 to 54 illustrate the application of a crank mechanism, of the Chebyshev lambda mechanism type or the same, to ensure the coverage of a path that is straight in a first direction, and curved in a second direction, to actuate a date disc.

FIG. 55 uses a Klann actuation mechanism, which actuates a toothing, for example to drive a display or an automatic winding wheel. The path of the carrier is more complex, it allows for a wide clearance, and a substantially radial retraction between two teeth of the wheel.

To sum up, the mechanisms according to the invention make the most of the space available in a watch, and improve the overall efficiency by minimising frictions.

The advantage of applying the invention to display mechanisms is the transformation of a rotational movement into a translational movement for a linear display with a single degree of freedom.

Figure 49:
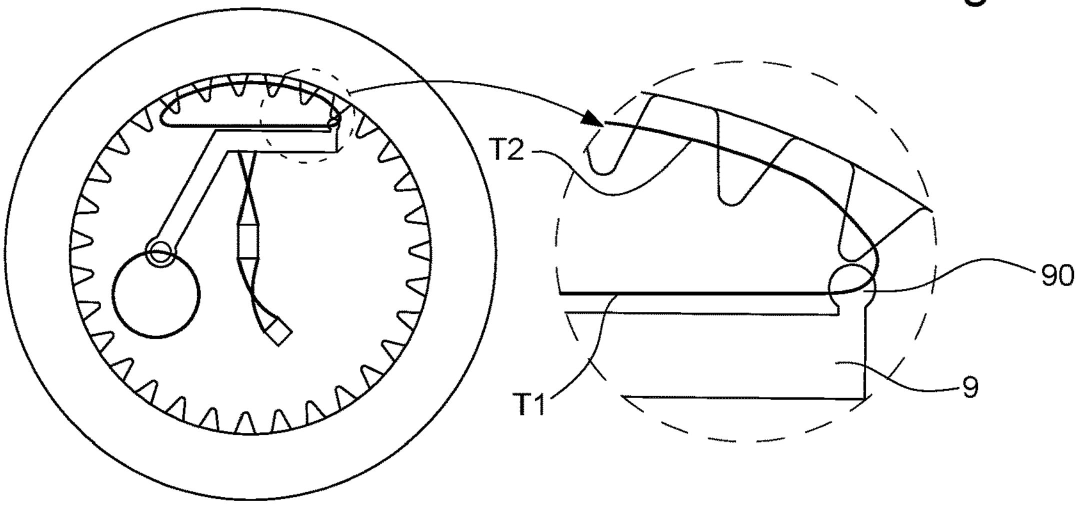
Figure 50:
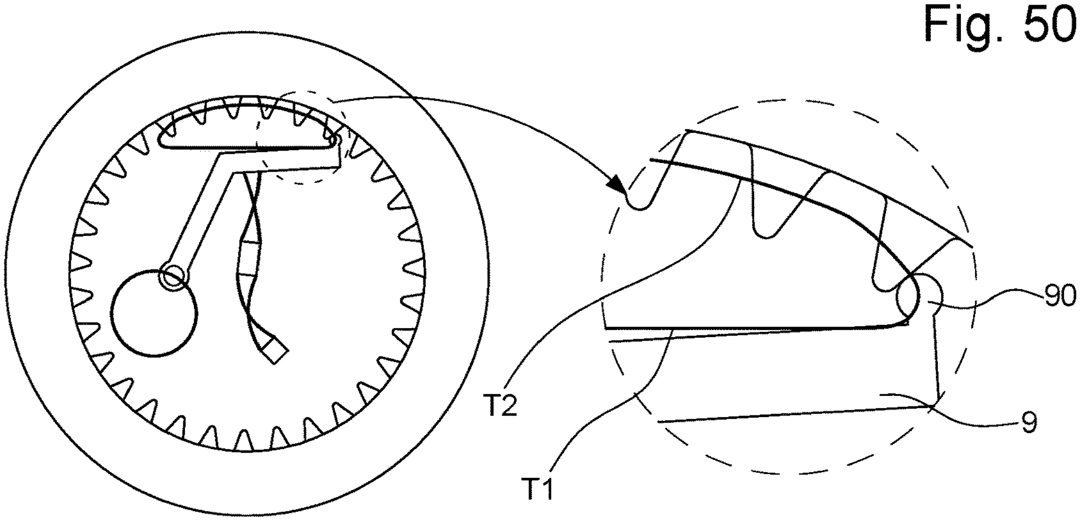
Figure 51:
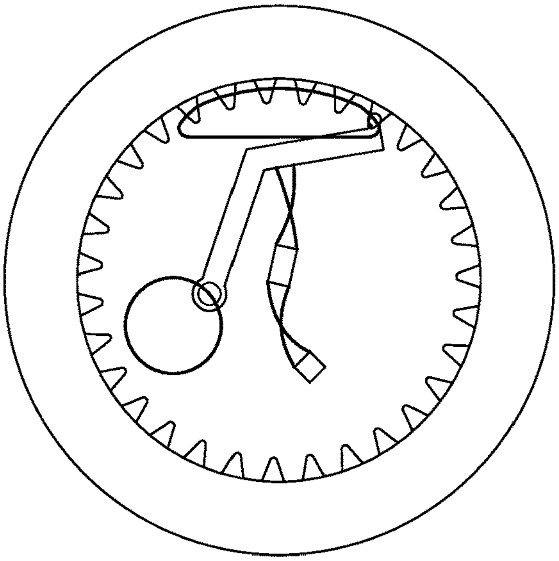
Figure 52:
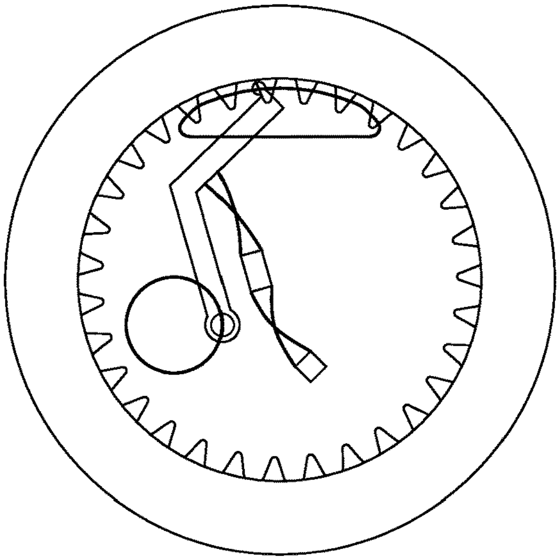
Figure 53:
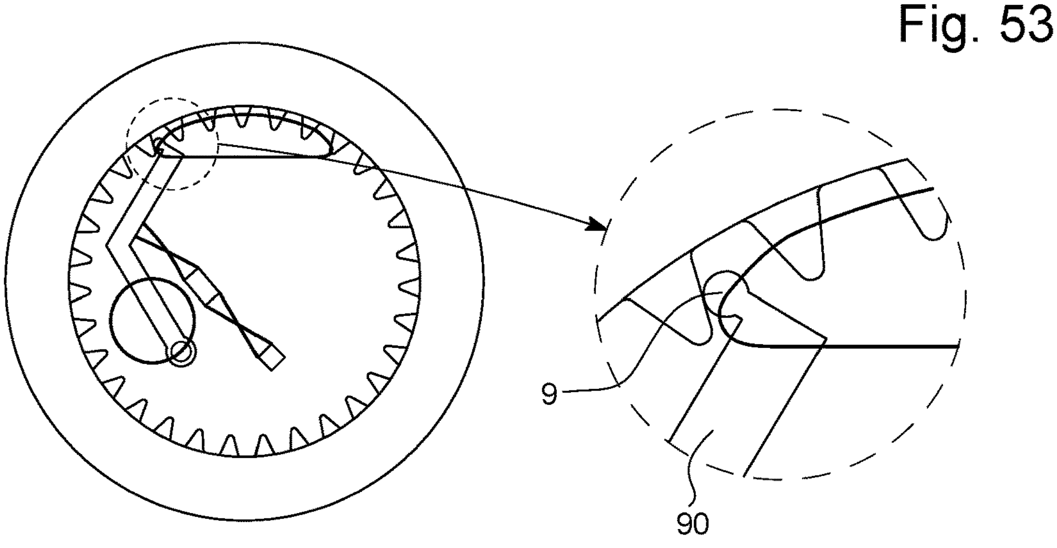
Figure 54:
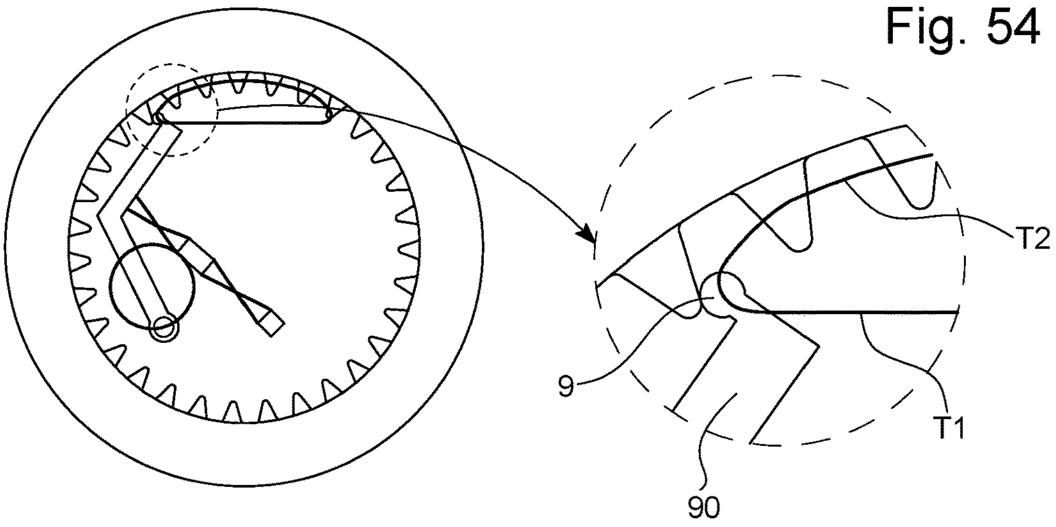

The advantage of the application of the invention to actuation mechanisms is the possibility of actuating a toothing with kinematics allowing for a minimum of friction. Indeed, in the case of the prior art, the actuator comes into contact with a tooth and circumvents it. Contact is necessary to circumvent the tooth. In general, when the carrier is a hook or the same, the back of this hook, i.e. the portion opposite to that which includes a bearing surface intended to modify the position of the toothing, rubs against the tooth, before the bearing surface drives the tooth, there are then large areas of friction and wear, which are detrimental to the efficiency of the mechanism, and to its resistance over time. On the other hand, in the case of the invention, the flexible guide guides the actuator to circumvent the tooth without contact, the kinematics of the linkage mechanism actually enabling a substantially radial approach, then the actuator comes into contact with the tooth only to actuate it. Hence, the friction areas are reduced, as well as the energy lost by friction. The details of FIGS. 49 and 50 show the use of the area with a small radius of curvature between the rectilinear path T1 and the curved path T2, to ensure this optimal kinematics.

The flexible guides, as used in these applications, have a great potential in watchmaking as they have the following properties and advantages:

- absence of wear;
- absence of lubrication;
- absence of seizing;
- absence of dust emission;
- absence of hysteresis;
- accuracy and repeatability;
- control and accuracy of the repetitive path;
- absence of backlash in the system.

The invention claimed is:

1. A linkage mechanism for a horological mechanism, arranged for a movement transmission between an actuator and a receiver, wherein said linkage mechanism includes a structure relative to which a carrier is movable according to only one degree of freedom under the action of one said actuator, said carrier being connected to said structure by at least one flexible guide, each of said carrier and said structure being more rigid than each said flexible guide, the carrier being guided according to the only one degree of freedom only by the flexible guide.

2. The linkage mechanism according to claim 1, wherein said carrier is movable according to a single degree of freedom, other than a pivoting one, and so that each point of said carrier follows a path other than circular.

3. The linkage mechanism according to claim 1, wherein at least one said flexible guide is planar, and includes flexible necks, with a smaller section than the elements that are adjacent thereto, and/or flexible blades, with a smaller section than the elements adjacent thereto, and forming articulations, and said linkage mechanism includes at least two arms articulated to said structure at two distinct points, said arms being arranged to kinematically cooperate with each other, or with a tertiary bar or a tertiary structure.

4. The linkage mechanism according to claim 1, wherein said linkage mechanism includes a first main articulation between said structure and a first arm, and a second main articulation between said structure and a second arm, and in that, either said first arm includes, at a distance from said first main articulation, a translation guide with flexible connections or a sliding element arranged to cooperate slidably and in an articulated manner with a complementary sliding element which includes, at a distance from said second main articulation, said second arm forming said carrier, or else said linkage mechanism includes, at a distance from said first main articulation, a first secondary articulation between said first arm and said carrier, and, at a distance from said second main articulation and from said first secondary articulation, a second secondary articulation between said second arm and said carrier, or between said second arm and an operating bar articulated with said carrier.

5. The linkage mechanism according to claim 4, wherein said linkage mechanism includes, at a distance from said first main articulation, a first secondary articulation between said first arm and said carrier, and, at a distance from said second main articulation and said first secondary articulation, a second secondary articulation between said second arm and said carrier, or between said second arm and an operating bar articulated with said carrier, and wherein said second secondary articulation is arranged between said second arm and one said operating bar articulated with said carrier, which operating bar is articulated respectively at a first operating articulation with said second arm, and at a second operating articulation with said carrier.

6. The linkage mechanism according to claim 5, wherein said structure includes a pivot arranged to guide in rotation a third bar which is articulated, at a third secondary articulation distant from said pivot, with said operating bar.

7. The linkage mechanism according to claim 4, wherein said first arm or said second arm is arranged to be driven by one said actuator.

8. The linkage mechanism according to claim 1, wherein at least one said flexible guide includes at least two parallel planar levels, and includes in each level flexible blades, with a smaller section than the elements that are adjacent thereto, and whose directions are crossed and whose projection, on a plane parallel to said levels, of the intersection of these directions defines a virtual pivot axis and an articulation.

9. The linkage mechanism according to claim 1, wherein said carrier, said structure, and said at least one flexible guide are coplanar.

10. The linkage mechanism according to claim 1, wherein said carrier is a third bar.

11. The linkage mechanism according to claim 10, wherein said third bar is arranged to be driven by one said actuator.

12. The linkage mechanism according to claim 1, wherein said carrier is a polygonal rigid structure.

13. The linkage mechanism according to claim 1, wherein said carrier is connected to said fixed structure by a plurality of said flexible guides.

14. The linkage mechanism according to claim 1, wherein said carrier is connected to said fixed structure only by one said flexible guide or a plurality of said flexible guides.

15. The linkage mechanism according to claim 1, wherein said linkage mechanism includes a plurality of said flexible guides disposed in series between said carrier and said structure and at least two successive said flexible guides of which are separated by an intermediate inertial mass to which they are both fastened or with which they form a monolithic assembly.

16. The linkage mechanism according to claim 1, wherein at least one said flexible guide includes a pivot with two separate crossed blades, or a pivot with two integral crossed blades, or an RCC pivot with two orthogonal blades, or an RCC pivot with 4 necks, or at least two blades at least locally parallel, or a translational guide with flexible collar connections.

17. The linkage mechanism according to claim 1, wherein said linkage mechanism is a composite mechanism including at least one said flexible guide made of silicon and/or silicon oxide, mechanically fastened to said carrier and to said structure by a pinned and/or screwed and/or glued and/or pinched connection.

18. The linkage mechanism according to claim 1, wherein said linkage mechanism is a monolithic mechanism.

19. The linkage mechanism according to claim 1, wherein said carrier includes, at a distal end, a hook or a finger or a tooth for driving one said receiver, and wherein the path of said distal end includes at least one linear or substantially linear section.

20. The linkage mechanism according to claim 19, wherein the path of said distal end is linear or substantially linear.

21. The linkage mechanism according to claim 19, wherein the path of said distal end includes a linear or substantially linear section corresponding to a first stroke T1 of said distal end in a first direction, and a concave curve joining the ends of said section and corresponding to a second stroke T2 of said distal end in a second direction opposite to said first direction.

22. A horological mechanism, including an actuator and a receiver, and at least one linkage mechanism according to claim 1, arranged for a movement transmission between said actuator and said receiver.

23. The horological mechanism according to claim 22, wherein said carrier is arranged to drive one said receiver by direct contact, or through a push-piece or a lever.

24. The horological mechanism according to claim 22, wherein said actuator is arranged to exert a continuous force on said linkage mechanism, over the entirety of a control stroke, to cause a stroke of said receiver.

25. The horological mechanism according to claim 22, wherein said actuator is arranged to exert an impulse on said linkage mechanism, to transmit an impulse to said receiver.

26. The horological mechanism according to claim 22, wherein said actuator is secured to one of the elements of said flexible guide or articulated with one of the elements of said flexible guide.

27. The horological mechanism according to claim 22, wherein said linkage mechanism is a Hoeckens mechanism arranged to transform a rotation imparted by said actuator into a linear retrograde movement of said receiver.

28. The horological mechanism according to claim 22, wherein said linkage mechanism is a Roberts mechanism arranged to transform a rotation imparted by said actuator into a linear retrograde movement of said receiver, said carrier being a vertex of a triangle whose other vertices are articulated to articulated bars that said linkage mechanism includes.

29. The horological mechanism according to claim 22, wherein said linkage mechanism is a Klann mechanism arranged to transform a continuous rotation imparted by said actuator into a periodic drive push on a toothing or a bearing surface that said receiver includes.

30. The horological mechanism according to claim 22, wherein said linkage mechanism is a Chebyshev lambda mechanism arranged to transform a continuous rotation imparted by said actuator into a periodic drive push on a toothing or a bearing surface that said receiver includes.

31. The horological mechanism according to claim 22, wherein said linkage mechanism includes a first main articulation between said structure and a first arm, and a second main articulation between said structure and a second arm, and wherein either said first arm includes, at a distance from said first main articulation, a translational guide with flexible collar connections or a sliding element arranged to cooperate slidably and in an articulated manner with a complementary sliding element that includes, at a distance from said second main articulation, said second arm forming said carrier, and wherein said linkage mechanism is a mechanism called Chebyshev linkage arranged to transform a rotation imparted by said actuator into a linear retrograde movement of said receiver.

32. A horological movement including at least one horological mechanism according to claim 22.

33. A watch including at least one horological movement according to claim 32.

* * * * *